US012238809B2

(12) United States Patent
Kwon et al.

(10) Patent No.: US 12,238,809 B2
(45) Date of Patent: Feb. 25, 2025

(54) TRANSMISSION OF A CONFIGURATION OF A WIRELESS COMMUNICATION DEVICE INDICATING ZONES

(71) Applicant: QUALCOMM Incorporated, San Diego, CA (US)

(72) Inventors: Hwan Joon Kwon, San Diego, CA (US); Huilin Xu, Temecula, CA (US); Yuchul Kim, San Diego, CA (US); Peter Pui Lok Ang, San Diego, CA (US); Yeliz Tokgoz, San Diego, CA (US); Jay Kumar Sundararajan, San Diego, CA (US); Krishna Kiran Mukkavilli, San Diego, CA (US); Tingfang Ji, San Diego, CA (US); Jing Lei, San Diego, CA (US); Ravi Agarwal, San Diego, CA (US); Seyong Park, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/302,369

(22) Filed: Apr. 18, 2023

(65) Prior Publication Data
US 2023/0254937 A1    Aug. 10, 2023

Related U.S. Application Data

(63) Continuation of application No. 17/218,991, filed on Mar. 31, 2021, now Pat. No. 11,665,771.
(Continued)

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0229* (2013.01); *H04W 52/0232* (2013.01);
(Continued)

(58) Field of Classification Search
CPC ............ H04W 76/28; H04W 52/0229; H04W 52/0232; H04W 72/0453; H04W 72/23; H04W 28/18; Y02D 30/70
See application file for complete search history.

(56) References Cited

U.S. PATENT DOCUMENTS 11,665,771 B2 *   5/2023   Kwon ............... H04W 52/0232
                                                    370/329
2010/0020758 A1 *  1/2010  Kim .................. H04W 72/0446
                                                    370/329
(Continued)

FOREIGN PATENT DOCUMENTS

CN    110839248 A    2/2020
CN    110876185 A    3/2020
(Continued)

OTHER PUBLICATIONS

International Search Report and Written Opinion—PCT/US2021/025478—ISA/EPO—Jul. 16, 2021.

*Primary Examiner* — Omar J Ghowrwal
(74) *Attorney, Agent, or Firm* — Haynes and Boone, LLP

(57) ABSTRACT

Wireless communication devices, systems, and methods related to power saving, including during connected mode operation and for extended reality (XR) data communications with or without discontinuous reception (DRX), are provided. For example, a method of wireless communication includes receiving, while in a connected mode, a configuration based on data traffic for the wireless communication device, the configuration indicating: a first zone associated with a first set of operating parameters for the wireless communication device; and a second zone associated with a
(Continued)

second set of operating parameters for the wireless communication device, the second set of operating parameters being different than the first set of operating parameters; operating in the first zone with the first set of operating parameters to monitor for a first downlink communication signal; and operating in the second zone with the second set of operating parameters.

26 Claims, 10 Drawing Sheets

Related U.S. Application Data

(60) Provisional application No. 63/008,583, filed on Apr. 10, 2020.

(51) Int. Cl.
*H04W 72/0453* (2023.01)
*H04W 72/23* (2023.01)
*H04W 28/18* (2009.01)

(52) U.S. Cl.
CPC ....... *H04W 72/0453* (2013.01); *H04W 72/23* (2023.01); *H04W 28/18* (2013.01); *Y02D 30/70* (2020.08)

(56) References Cited

U.S. PATENT DOCUMENTS

| | | | |
|---|---|---|---|
| 2016/0100360 A1* | 4/2016 | Liu | H04W 72/21 370/311 |
| 2019/0069336 A1* | 2/2019 | Malik | H04W 24/02 |
| 2020/0037247 A1 | 1/2020 | Liao et al. | |
| 2020/0037396 A1* | 1/2020 | Islam | H04W 52/0229 |
| 2021/0321480 A1 | 10/2021 | Kwon et al. | |

FOREIGN PATENT DOCUMENTS

| | | |
|---|---|---|
| EP | 3457767 A1 | 3/2019 |
| WO | 2020032868 A1 | 2/2020 |

\* cited by examiner

TRANSMISSION OF A CONFIGURATION OF A WIRELESS COMMUNICATION DEVICE INDICATING ZONES

CROSS-REFERENCE TO RELATED APPLICATIONS

The present application is a continuation application of U.S. Non-Provisional patent application Ser. No. 17/218,991, filed Mar. 31, 2021, which claims priority to and the benefit of U.S. Provisional Patent Application No. 63/008,583, filed Apr. 10, 2020, the disclosure of each of which is hereby incorporated by reference in its entirety as if fully set forth below and for all applicable purposes.

TECHNICAL FIELD

This application relates to wireless communication systems, and more particularly to methods (and associated devices and systems) for power saving, including during connected mode operation and for extended reality (XR) data communications with or without discontinuous reception (DRX).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Extended reality (XR) continues to be a growing area of wireless communication usage. XR can include augmented reality (AR), mixed reality (MR) and/or virtual reality (VR) devices, systems, and/or communications. An XR device can be a mobile device (e.g. phone, tablet, glasses, watch, goggles, etc.) that facilitates XR wireless communications, including supporting wireless data exchanges with a server. Many XR applications support dynamic reconstruction of a three-dimensional (3D) environment and/or fusion of a real-world environment with a virtual environment. As a result, XR applications can require high quality video and/or audio data communications with low latency, which can cause significant power demands on the XR devices. At the same time, because many XR devices are wearable and mobile, users have an expectation for the XR devices to provide good battery life and remain comfortable during use (e.g., avoiding overheating), providing an overall good user experience. As a result, there is a need to provide power efficient designs for downlink wireless data communications, including XR data communications, in a manner that delivers users with the expected levels of communication latency and throughput, while also providing power savings and prolonged battery life.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide power efficient designs for downlink wireless data communications, including XR data communications, in a manner that delivers users with the expected levels of communication latency and throughput, while also providing power savings and prolonged battery life. Aspects of the present disclosure account for diverse communication environments, including the traffic pattern(s) of one or multiple XR devices in a cell. As a result, techniques of the present disclosure can address different performance requirements—including XR data throughput and latency requirements—using device-specific and/or group-specific downlink data configurations. The downlink data configurations can define one or more operating zones (e.g., a power saving zone, an urgent transmission zone, a no transmission zone, etc.) for use by a wireless communication device. The operating zones can be used whether a wireless communication device is discontinuous reception (DRX)-enabled or not. In some instances, the operating zones are utilized to further enhance the power saving gains of DRX-enabled devices. Use of the downlink data configurations of the present disclosure can provide improved user experiences through power saving (including improved power saving over DRX and connected mode DRX (CDRX) techniques), prolonging battery life, maintaining comfortable device temperatures, multiplexing data transmissions for multiple users (including multiple XR users), satisfying latency requirements, etc.

In an aspect of the disclosure, a method of wireless communication performed by a wireless communication device includes receiving, while in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; operating in the first zone with the first set of operating parameters to monitor for a first downlink communication signal; and operating in the second zone with the second set of operating parameters In an additional aspect of the disclosure, a method of wireless communication performed by a base station includes transmitting, to a wireless communication device in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; and transmitting a downlink communication signal to the wireless communication device based on the configuration.

In an additional aspect of the disclosure, an apparatus includes a receiver configured to: receive, while in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; a processor in communication with the receiver, the processor configured to cause the apparatus to: operate in the first zone with the first set of operating parameters to monitor for a first downlink communication signal; and operate in the second zone with the second set of operating parameters.

In an additional aspect of the disclosure, an apparatus includes a transmitter configured to: transmit, to a wireless communication device in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; and transmit a downlink communication signal to the wireless communication device based on the configuration.

In an additional aspect of the disclosure, a wireless communication device includes means for receiving, while in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; means for operating in the first zone with the first set of operating parameters to monitor for a first downlink communication signal; and means for operating in the second zone with the second set of operating parameters.

In an additional aspect of the disclosure, a base station includes means for transmitting, to a wireless communication device in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; and means for transmitting a downlink communication signal to the wireless communication device based on the configuration.

In an additional aspect of the disclosure, a non-transitory computer-readable medium has program code recorded thereon for wireless communication by a wireless communication device, the program code including code for causing the wireless communication device to receive, while in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; code for causing the wireless communication device to operate in the first zone with the first set of operating parameters to monitor for a first downlink communication signal; and code for causing the wireless communication device to operate in the second zone with the second set of operating parameters.

In an additional aspect of the disclosure, a non-transitory computer-readable medium has program code recorded thereon for wireless communication by a base station, the program code including code for causing the base station to transmit, to a wireless communication device in a connected mode, a configuration based on data traffic for the wireless communication device, the configuration indicating: a first zone associated with a first set of operating parameters for the wireless communication device; and a second zone associated with a second set of operating parameters for the wireless communication device, the second set of operating parameters being different than the first set of operating parameters; and code for causing the base station to transmit a downlink communication signal to the wireless communication device based on the configuration.

Other aspects, features, and advantages of the present invention will become apparent to those of ordinary skill in the art, upon reviewing the following description of specific, exemplary embodiments of the present invention in conjunction with the accompanying figures. While features of the present invention may be discussed relative to certain examples and figures below, all embodiments of the present invention can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
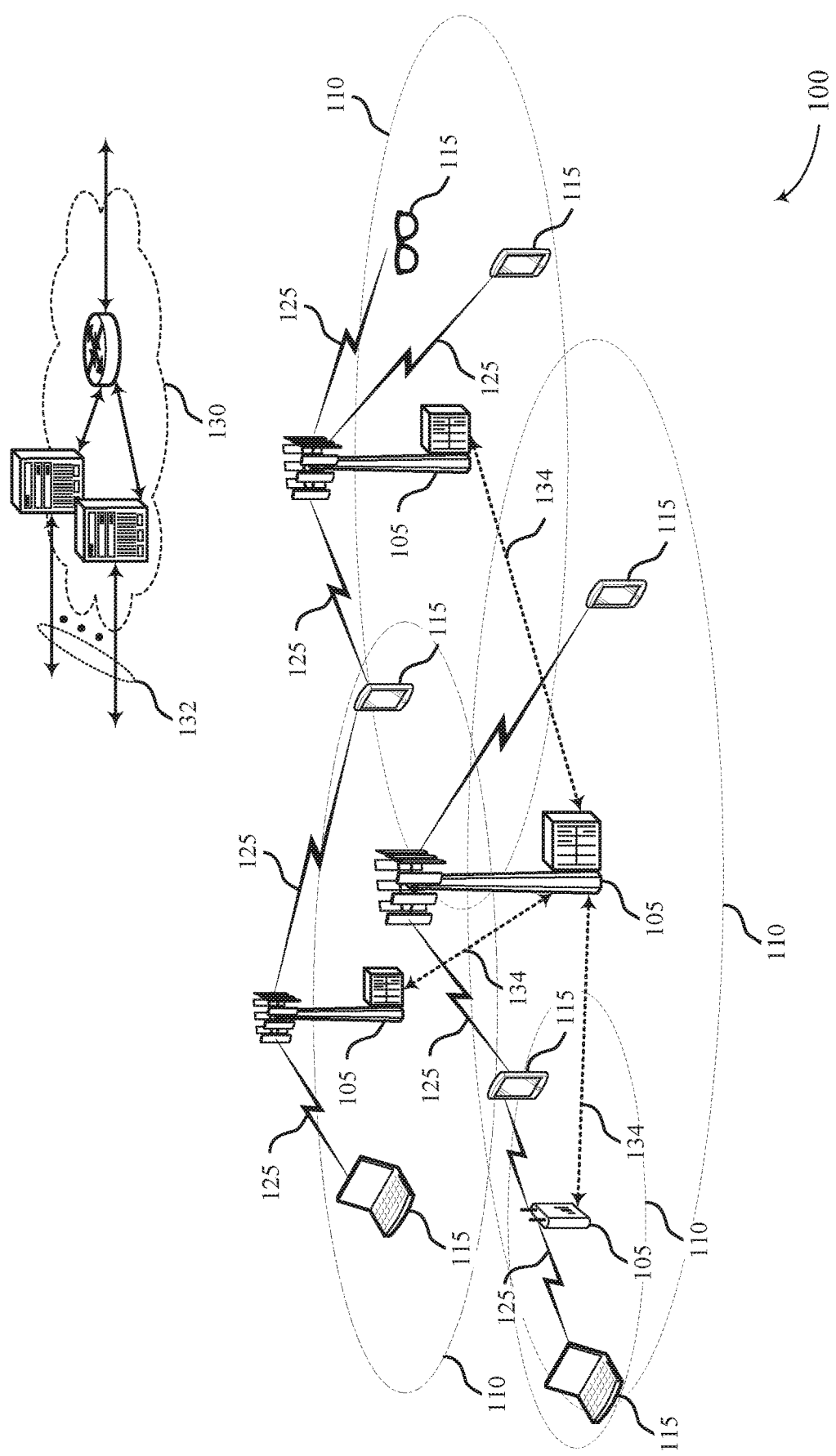
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Extended reality (XR) continues to be a growing area of wireless communication usage. XR can include augmented reality (AR), mixed reality (MR) and/or virtual reality (VR) devices, systems, and/or communications. An XR device can be a mobile device (e.g. phone, tablet, glasses, watch, goggles, etc.) that facilitates XR wireless communications, including supporting wireless data exchanges with a server. Many XR applications support dynamic reconstruction of a three-dimensional (3D) environment and/or fusion of a real-world environment with a virtual environment. As a result, XR applications can require high quality video and/or audio data communications with low latency, which can cause significant power demands on the XR devices. At the same time, because many XR devices are wearable and mobile, users have an expectation for the XR devices to provide good battery life and remain comfortable during use (e.g., avoiding overheating), providing an overall good user experience.

In a wireless communication network, discontinuous reception (DRX) is a technique in which a UE may enter a sleep mode for a certain period of time and enter a wake-up mode for another period of time. During the wake-up period, the UE may monitor for PDCCH from a serving BS and decode PDCCH received from the BS. During the sleep period, the UE may not monitor for PDCCH. The sleep mode allows the UE to power down certain radio components or at least switch certain radio components to a lower power state than an active state. Accordingly, the use of DRX can provide power savings at the UE. However, DRX techniques, including connected mode DRX (CDRX), do not consider or account for specific characteristics and requirements of XR traffic. In this regard, for existing DRX and CDRX techniques UE behavior is fixed across the entire wakeup duration or active state and does not account for the data traffic, including XR data traffic, for the UE that may have short latency requirements. As a result, there is a need to provide power efficient designs for downlink wireless data communications, including XR data communications, in a manner that delivers users with the expected levels of communication latency and throughput, while also providing power savings and prolonged battery life.

Aspects of the present disclosure provide power efficient designs for downlink wireless data communications, including XR data communications, in a manner that delivers users with the expected levels of communication latency and throughput, while also providing power savings and prolonged battery life. Aspects of the present disclosure account for diverse communication environments, including the traffic pattern(s) of one or multiple XR devices in a cell. As a result, techniques of the present disclosure can address different performance requirements—including XR data throughput and latency requirements—using device-specific and/or group-specific downlink data configurations. The downlink data configurations can define one or more operating zones (e.g., a power saving zone, an urgent transmission zone, a no transmission zone, etc.) for use by a wireless communication device. The operating zones can be used whether a wireless communication device is DRX-enabled or not. In some instances, the operating zones are utilized to further enhance the power saving gains of DRX-enabled devices. Use of the downlink data configurations of the present disclosure can provide improved user experiences through power saving (including improved power saving over DRX and connected mode DRX (CDRX) techniques), prolonging battery life, maintaining comfortable device temperatures, multiplexing data transmissions for multiple users (including multiple XR users), satisfying latency requirements, etc.

These and other aspects of the present disclosure can provide several benefits. For example, the amount of time a UE can spend in a sleep mode as part of a DRX operation, including a connected mode DRX (C-DRX), can be increased, reducing power consumption and increasing battery life. In this regard, having the UE enter a sleep state during part of the wakeup period instead of unnecessarily monitoring for PDCCH during the entire wakeup period facilitates the UE powering down or off one or more components of the UE associated with receiving, decoding, and/or otherwise processing PDCCH signals. Similarly, the amount of time a BS can refrain from transmitting signals as part of a DTX operation can be increased, reducing the power consumption of the BS, reducing network traffic, saving system resources, and reducing the potential for interference. Further, the power saving downlink wireless data communication approaches of the present disclosure can be used by devices that are not DRX-enabled, providing power saving, prolonging battery life, and/or maintaining comfortable device temperatures that may not otherwise be available for these non-DRX-enabled devices. Further still, aspects facilitate multiplexing data transmissions for a larger number of simultaneous users (including simultaneous XR users) than existing approaches. For example, in some instances the present disclosure facilitates the use of cross-slot scheduling of downlink data communications relative to a related downlink control signal can facilitate a larger number of downlink data communications to be scheduled within the required latency requirements for the communications. Also, the power saving advantages and multiplexing benefits of the present disclosure are provided in a manner that still satisfies the latency requirements of the data communications, including XR data communications. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$k$ are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115$e$, which may be a drone. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-hop configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 and the UE 115 may employ hybrid automatic request (HARQ) techniques for communications to improve reliability. Additionally, the UE 115 and/or the BS 105 can utilize DRX (e.g., during RRC idle mode), including connected mode DRX (C-DRX) (e.g., during RRC connected mode), and/or DTX operating modes.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some instances, a BS 105 may assign a pair of BWPs within the CC to a UE 115 for UL and DL communications. For example, the BWP pair may include one BWP for UL communications and one BWP for DL communications. In some instances, the BS 105 may dynamically switch the UE 115 from one BWP to another BWP, for example, from a wideband BWP to a narrowband BWP for power savings or from a narrowband BWP to a wideband BWP for communication.

The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. The BS 105 may configure the UE 115 with various different CORSETs and/or search spaces for different types of PDCCH monitoring (e.g., DL/UL schedules and/or wake-up information). In an example, the BS 105 may configure the UE 115 with the BWPs, the CORESETS, and/or the PDCCH search spaces via RRC configurations.

In an embodiment, the BS 105 may establish a RRC connection with the UE 115 in a primary cell (PCell) (e.g., over a primary frequency carrier) and may subsequently configure the UE 115 to communicate over a secondary cell (SCell) (e.g., over a secondary frequency carrier). In an embodiment, the BS 105 may trigger the UE 115 to report channel information based on channel-state-information-reference signal (CSI-RS) transmitted by the BS 105. In some instances, the triggering may be aperiodic, which may be referred to as aperiodic-CSI-RS (A-CSI-RS) triggering.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
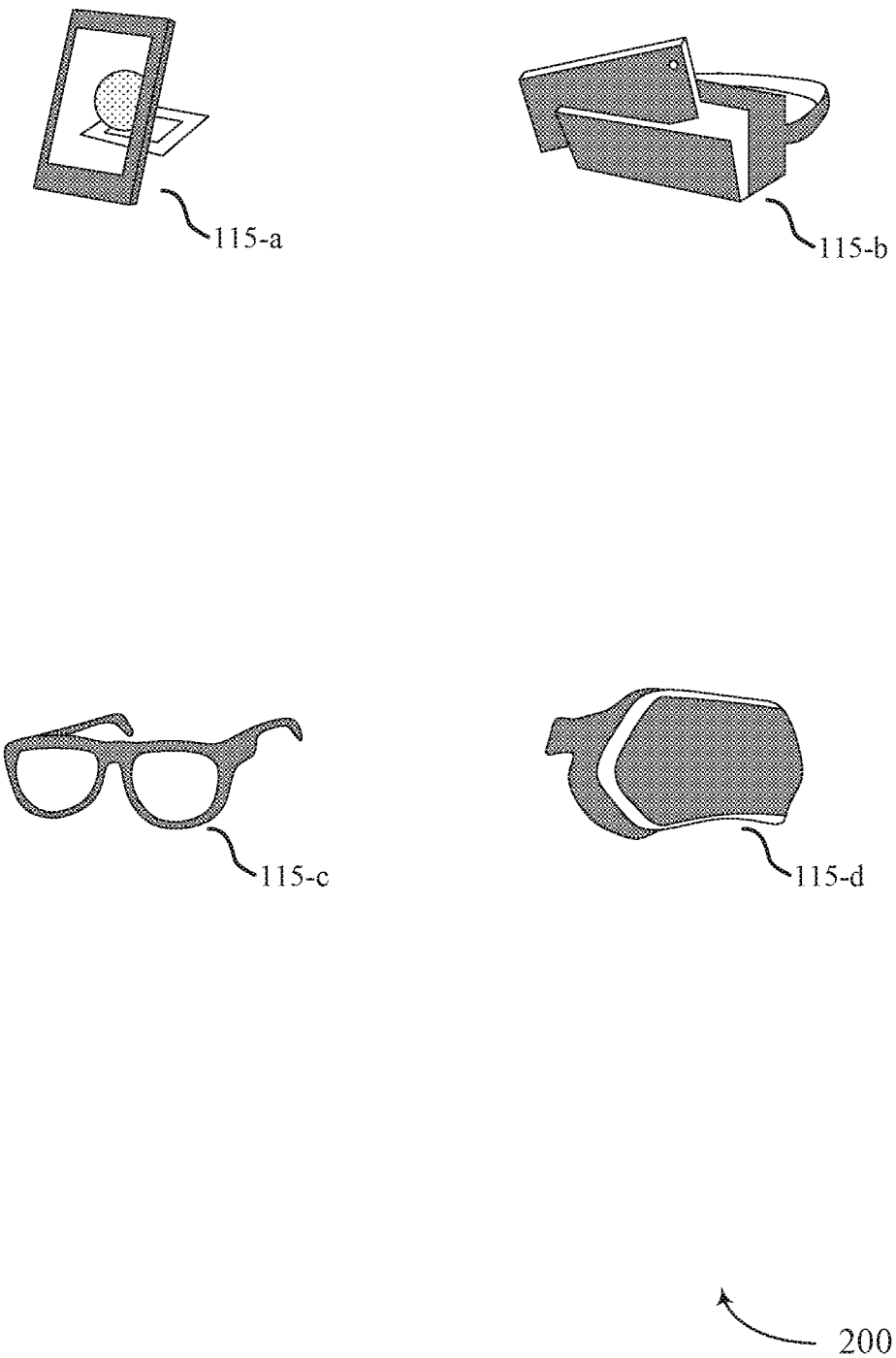
FIG. 2 illustrates examples of extended reality (XR) devices according to some aspects of the present disclosure.

The UE 115 may be an extended reality (XR) device, including without limitation an augmented reality (AR) device, a mixed reality (MR) device, a virtual reality (VR) device, a head mounted device (HMD), a wearable device, etc. In this regard, FIG. 2 illustrates examples of XR devices 200 according to some aspects of the present disclosure. In particular, the illustrated XR devices 200 include (1) an AR and/or MR smartphone, tablet, or portable console 115-*a*; (2) an AR, MR, and/or VR wearable system that includes a smartphone, tablet, or portable console along with a mounting structure (e.g., head band configured to received and/or couple with the smartphone, tablet, or portable console); (3) AR and/or MR smart glasses 115-*c*; and (4) VR goggles 115-*d*. It is understood that aspects of the present disclosure are generally suitable for use with any type of XR devices, not only those shown in FIG. 2. Further, it is understood that each of the XR devices 200 may be tethered to other devices, including smartphones, personal computers (PCs), or consoles. Accordingly, an XR device may connect to another device using a universal serial bus (USB) link, a BLUETOOTH™ link, a Wi-Fi™ link, a 5G sidelink, or other suitable connection. In some instances, an XR device receives downlink data from a server, host, or other device through the device that the XR device is tethered to. Accordingly, it is understood that aspects of the present disclosure are suitable for use XR devices alone and/or tethered to one or more other devices through which the XR device receives data.

Figure 3:
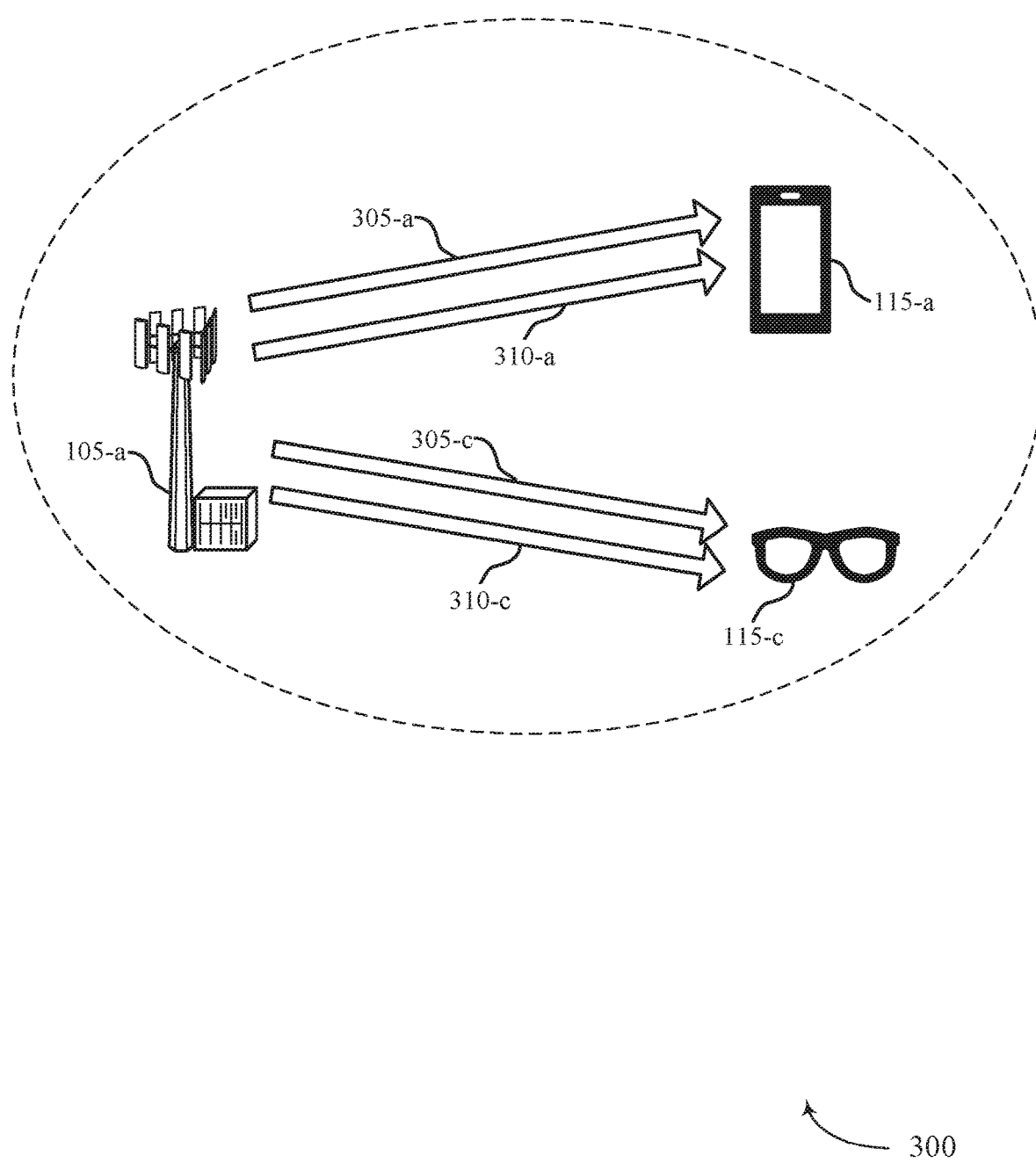
FIG. 3 illustrates a power saving downlink communication technique according to some aspects of the present disclosure.

FIG. 3 illustrates a power saving downlink communication technique 300 according to some aspects of the present disclosure. As shown, the base station 105-*a* transmits a downlink configuration communication 305-*a* to UE 115-*a*. The downlink configuration communication 305-*a* can include a configuration indicating one or more zones and associated operating parameters for use by the UE 115-*a* in receiving downlink communications from the base station 105-*a*. For example, the zones indicated by the configuration may include one or more power saving zones, one or more urgent transmission zones, and/or one or more no transmission zones. In some instances, the base station 105-*a* determines and/or selects the configuration and/or one or more of the operating parameters for each of the zones (e.g., based on data traffic, including XR data traffic, for the UE 115-*a* and/or one or more other wireless communication devices (e.g., UE 115-*c*) connected to the base station 105-*a*). The downlink configuration communication 305-*a* can be transmitted to the UE 115-*a* via at least one of a radio resource control (RRC) configuration, downlink control information (DCI), or a media access control control element (MAC-CE).

As shown, the base station 105-*a* also transmits a downlink data communication 310-*a* to UE 115-*a*. The downlink data communication 310-*a* can be transmitted by the base station 105-*a* and received by the UE 115-*a* in accordance with the configuration included in the downlink configuration communication 305-*a*. For example, downlink data communication 310-*a* can be communicated based on the operating parameters of the one or more zones indicated by the configuration. The downlink data communication 310-*a* can be communicated over a physical downlink shared channel (PDSCH).

In a similar manner, the base station 105-*a* also transmits a downlink configuration communication 305-*c* and a downlink data communication 310-*c* to UE 115-*c*. In this regard, the base station may determine and/or select a different configuration for UE 115-*c* compared to UE 115-*a*. That is, a configuration may be specific to a particular wireless communication device and/or a group of wireless communication devices. Further, the configuration for a particular wireless communication device (e.g., UE-115*a* or UE-115*c*) or group of wireless communication devices (e.g., UE-115*a* and UE 115-*c*) may be changed or updated by the base station dynamically, semi-statically, periodically, and/or a combination thereof.

Figure 4:
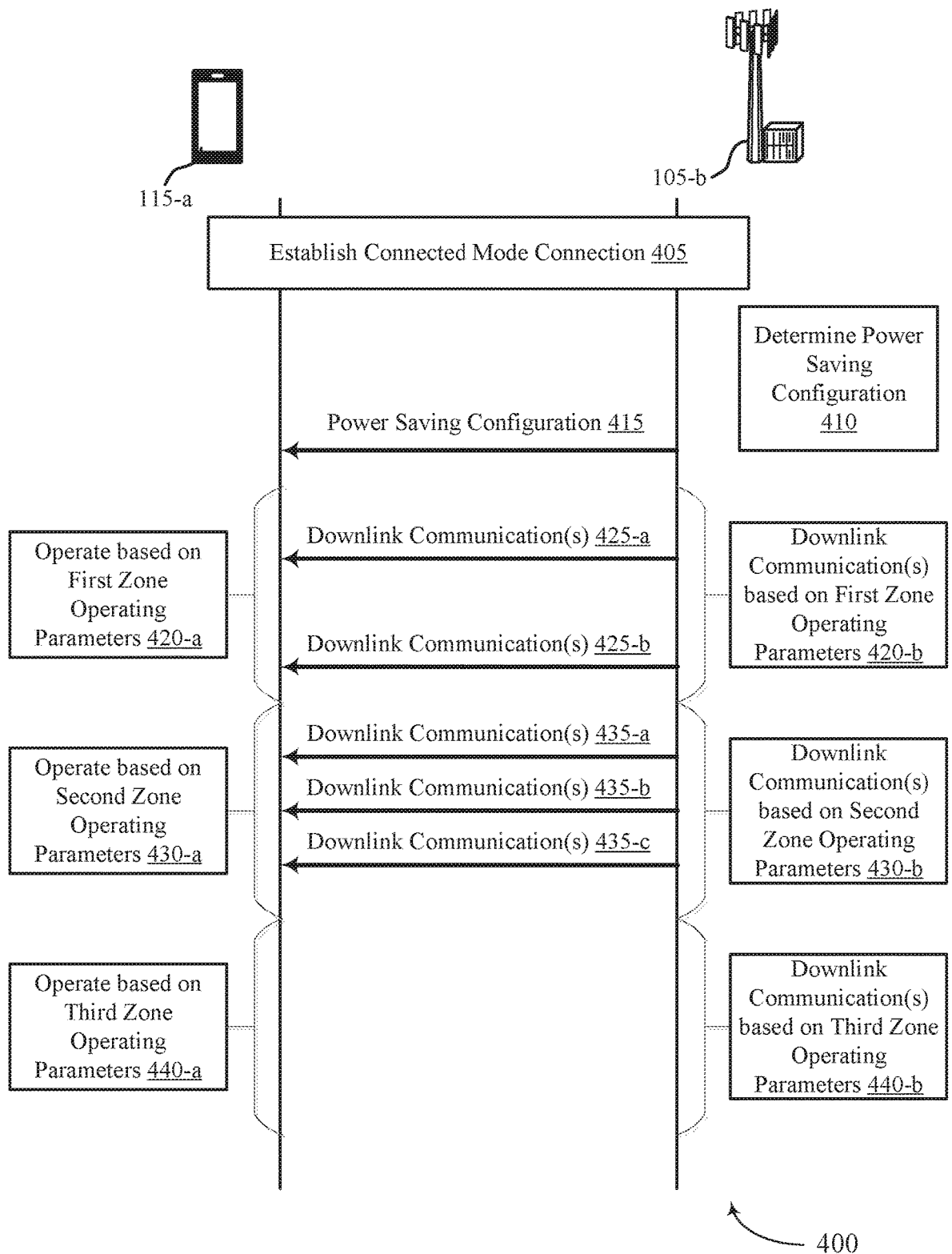
FIG. 4 illustrates a protocol diagram of a wireless communication method according to some aspects of the present disclosure.

FIG. 4 illustrates a protocol diagram of a wireless communication method 400 according to some aspects of the present disclosure. As shown, at step 405 the UE 115-*a* and the base station 105-*b* establish a connected mode connection. In some instances, the UE 115-*a* and the base station 105-*b* establish a radio resource control (RRC) connection at step 405. At step 410, the BS 105-*b* determines a power saving configuration for the UE 115-*a*. In some instances, the power saving configuration indicates one or more zones and associated operating parameters for use by the UE 115-*a* in receiving downlink communications from the base station 105-*b*. For example, the zones indicated by the power saving configuration may include one or more power saving zones, one or more urgent transmission zones, and/or one or more no transmission zones. In the example shown in FIG. 4, three different zones are illustrated (i.e., first zone, second zone, and third zone). However, it is understood that any number of zones may be used. It is also understood that multiple zones of the same or similar type may be used, including with one or more different operating parameters between the same or similar zone types. The base station 105-*b* may determine and/or select the zones and/or operating parameters for each zone based on data traffic and associated latency requirements for the UE 115-*a* and/or one or more other wireless communication devices connected to the base station 105-*b*.

At step 415, the base station 105-*b* transmits the power saving configuration to the UE 115-*a*. The power saving configuration can be transmitted to the UE 115-*a* via at least one of a radio resource control (RRC) configuration, downlink control information (DCI), or a media access control control element (MAC-CE).

At step 420-*a*, the UE 115-*a* operates based on the first zone operating parameters as indicated in the power saving configuration received at step 415. Similarly, at step 420-*b* the base station 105-*b* performs downlink communication(s) based on the first zone operating parameters. The operating parameters of the first zone can include a slot offset, a bandwidth part, a CDRX inactivity timer duration if CDRX is configured to the UE, etc. In this regard, the associated values of these operating parameters can be selected to achieve one or more operating goals for the zone, such as power saving and/or ensuring latency requirements are met.

In some instances, the first zone is a power saving zone and includes a set of operating parameters configured to provide power saving to the UE 115-*a*. For example, the power saving zone may have an offset (e.g., K0>0) between a slot in which scheduling downlink control information is communicated (e.g., over PDCCH) and the slot in which the associated scheduled data is communicated (e.g., over PDSCH). Having a slot offset greater than zero can allow cross-slot scheduling of data transmissions, which can facilitate multiplexing data transmissions for a larger number of simultaneous users (including simultaneous XR users) and allow the UE to adopt lower power operation more often if the UE knows based on an earlier downlink scheduling configuration that there are no other downlink channels or signals to receive or uplink channels or signals to transmit between the PDCCH and the scheduled PDSCH. Further, the power saving zone may have a bandwidth part that has a smaller bandwidth than a bandwidth part of the second zone, for example. Using a smaller bandwidth can allow the UE 115-*a* to monitor for downlink communications using less resources and/or power. Further still, in some instances the first zone includes an inactivity timer value that facilitates power savings. In this regard, the inactivity timer value may be associated with a duration for the UE to stay active for downlink control information monitoring (e.g., over PDCCH). In some instances, the inactivity timer value is associated with a CDRX inactivity timer if CDRX is configured to the UE. When the inactivity timer expires, and the UE has not detected any downlink control activity, then the UE can enter a sleep mode and/or reduced power state. Accordingly, the power saving zone may have an inactivity timer value that is smaller/shorter than an inactivity timer value of the second zone to provide additional power savings.

In the illustrated example of FIG. 4, the base station 105-*b* transmits downlink communication(s) 425-*a* and 425-*b* in the first zone. The downlink communication(s) 425-*a* and 425-*b* may include a downlink configuration communication (e.g., via PDCCH, RRC, MAC-CE) and an associated downlink data communication (e.g. via PDSCH). As discussed above, in some instances the downlink data communication may be transmitted (and received) in a different slot than the downlink configuration communication in accordance with the operating parameters of the first zone.

At step 430-*a*, the UE 115-*a* operates based on second zone operating parameters as indicated in the power saving configuration received at step 415. Similarly, at step 430-*b* the base station 105-*b* performs downlink communication(s) based on the second zone operating parameters. The operating parameters of the second zone can include a slot offset, a bandwidth part, a CDRX inactivity timer duration if CDRX is configured to the UE, etc. In this regard, the associated values of these operating parameters can be selected to achieve one or more operating goals for the zone, such as power saving and/or ensuring latency requirements are met.

In some instances, the second zone is an urgent transmission zone and includes a set of operating parameters configured to ensure the UE 115-*a* receives downlink data communications within any associated latency requirements. For example, the urgent transmission zone may either have zero slot offset (e.g., K0=0) such that the downlink control information and the associated data are transmitted in the same slot or have an offset value less than the offset of a power saving zone (e.g., $K0_{UTZ} < K0_{PSZ}$). Further, the urgent transmission zone may have a bandwidth part that has a larger bandwidth than a bandwidth part of the first zone, for example. Using a larger bandwidth for the bandwidth part of the urgent transmission zone can help ensure that the downlink communication is successfully received by the UE within the required latency timeframe. Further still, in some instances the second zone includes an inactivity timer value that facilitates successful downlink communications. In this regard, the inactivity timer value may be associated with a duration for the UE to stay active for downlink control information monitoring (e.g., over PDCCH). In some instances, the inactivity timer value is associated with a CDRX inactivity timer if CDRX is configured to the UE. When the inactivity timer expires, and the UE has not detected any downlink control activity, then the UE can enter a sleep mode and/or reduced power state. Accordingly, the urgent transmission zone may have an inactivity timer value that is larger/longer than an inactivity timer value of the first zone to help ensure that any downlink scheduling is successfully received by the UE (along with the associated data transmission) within the required latency timeframe for the downlink data communication.

At step 440-*a*, the UE 115-*a* operates based on third zone operating parameters as indicated in the power saving configuration received at step 415. Similarly, at step 440-*b* the base station 105-*b* performs downlink communication(s) based on the third zone operating parameters. In some instances, the third zone is a no transmission zone and includes a set of operating parameters associated with the UE 115-*a* operating in a sleep mode. The sleep mode can be a deep sleep, a light sleep, a micro sleep, and/or a combination thereof. Accordingly, in some instances the base station 105-*b* refrains from transmitting downlink communication(s) during the third zone, as shown in FIG. 4.

Figure 5:
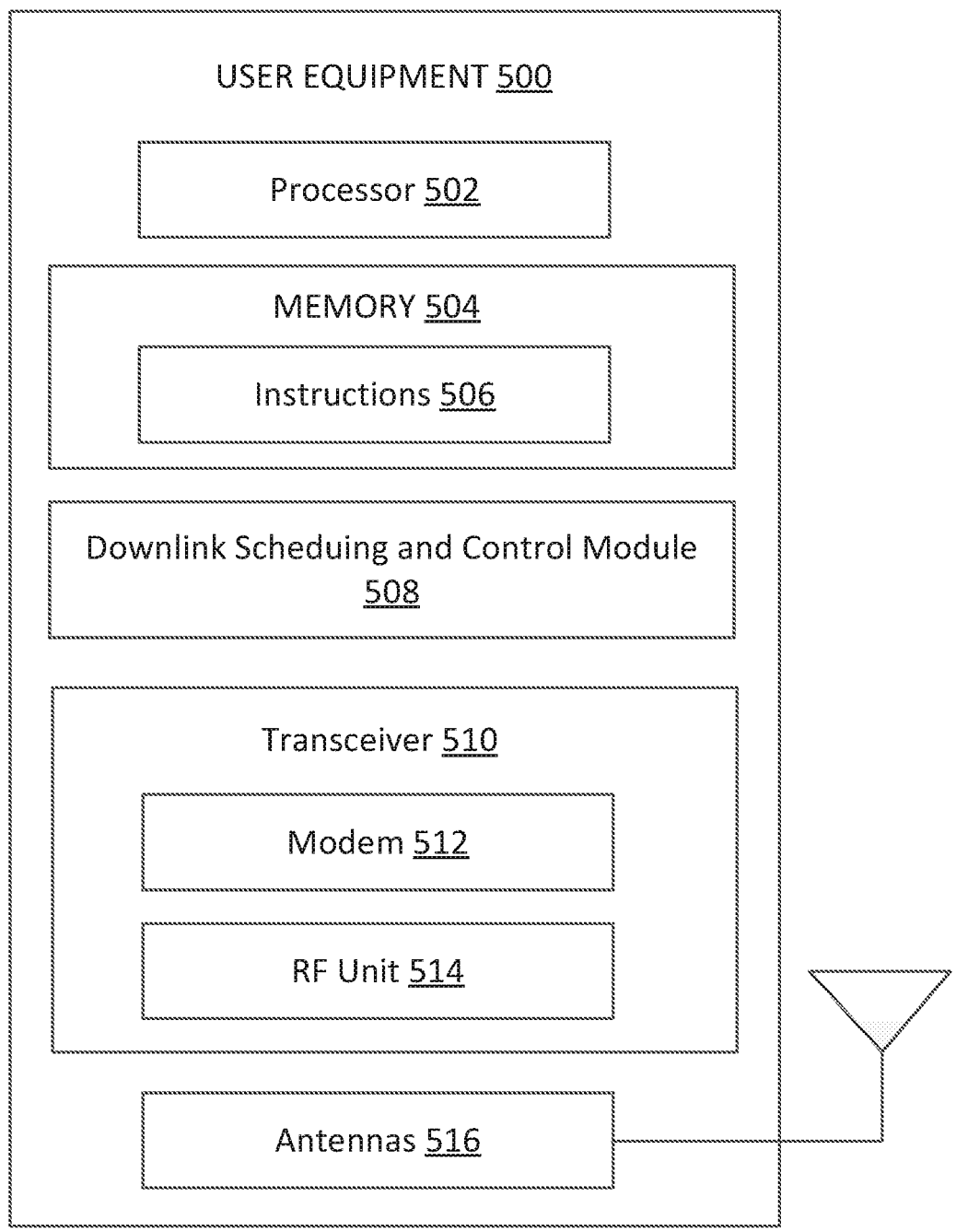
FIG. 5 is a block diagram of a user equipment (UE) according to some aspects of the present disclosure.

FIG. 5 is a block diagram of an exemplary UE 500 according to aspects of the present disclosure. The UE 500 may be a UE 115 (as discussed above in FIG. 1) and/or an XR device 200 (as discussed above in FIG. 2). As shown, the UE 500 may include a processor 502, a memory 504, a downlink scheduling and control module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 3, 4, and 7-9. Instructions 506 may also be referred to as program code. The program code may be for causing a wireless communication device (or specific component(s) of the wireless communication device) to perform these operations, for example by causing one or more processors (such as processor 502) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The downlink scheduling and control module 508 may be implemented via hardware, software, or combinations thereof. For example, downlink scheduling and control module 508 may be implemented as a processor, circuit, and/or instructions 506 stored in the memory 504 and executed by the processor 502. In some examples, the downlink scheduling and control module 508 can be integrated within the modem subsystem 512. For example, the downlink scheduling and control module 508 can be implemented by a combination of software components (e.g., executed by a DSP or a general processor) and hardware components (e.g., logic gates and circuitry) within the modem subsystem 512.

The downlink scheduling and control module 508 may be used for various aspects of the present disclosure, for example, aspects of FIGS. 3, 4, and 7-9. The downlink scheduling and control module 508 is configured to communicate with other components of the UE 500 to receive a power saving configuration, monitor for one or more downlink communication(s) from a base station based on the power saving configuration, determine when to operate in one or more zones of the power saving configuration, operate in accordance with the operating parameters (e.g., slot offset, bandwidth part bandwidth, inactivity timer, etc.) of each of the zones of the power saving configuration, perform PDCCH monitoring, perform PDSCH monitoring, determine whether a timer has expired, cancel a timer, determine whether a condition has occurred or is met, and/or perform other functionalities related to the power saving configurations and associated wireless communication techniques of a UE described in the present disclosure.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, and/or the downlink scheduling and control module 508 according to a modulation and coding scheme (MCS) (e.g., a low-density parity check (LDPC) coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., UL control information, UL data) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data (e.g., data packets or, more generally, data messages that may contain one or more data packets and other information) to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDCCH signals, radio resource control (RRC) signals, media access control (MAC) control element (CE) signals, PDSCH signals, DL/UL scheduling grants, DL data, etc.) to the downlink scheduling and control module 508 for processing. The antennas 516 may include multiple antennas of similar or different designs in order to sustain multiple transmission links. The RF unit 514 may configure the antennas 516. The RF unit 514 and/or the transceiver 510 may include components and/or circuitries that can be powers on and/or off dynamically for power savings. Additionally, or alternatively, the RF unit 514 and/or the transceiver 510 may include components and/or circuitries with multiple power states that can be configured to transition from one power state (e.g., a higher-power state) to another power state (e.g., a lower-power state) for power savings.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement different RATs.

Figure 6:
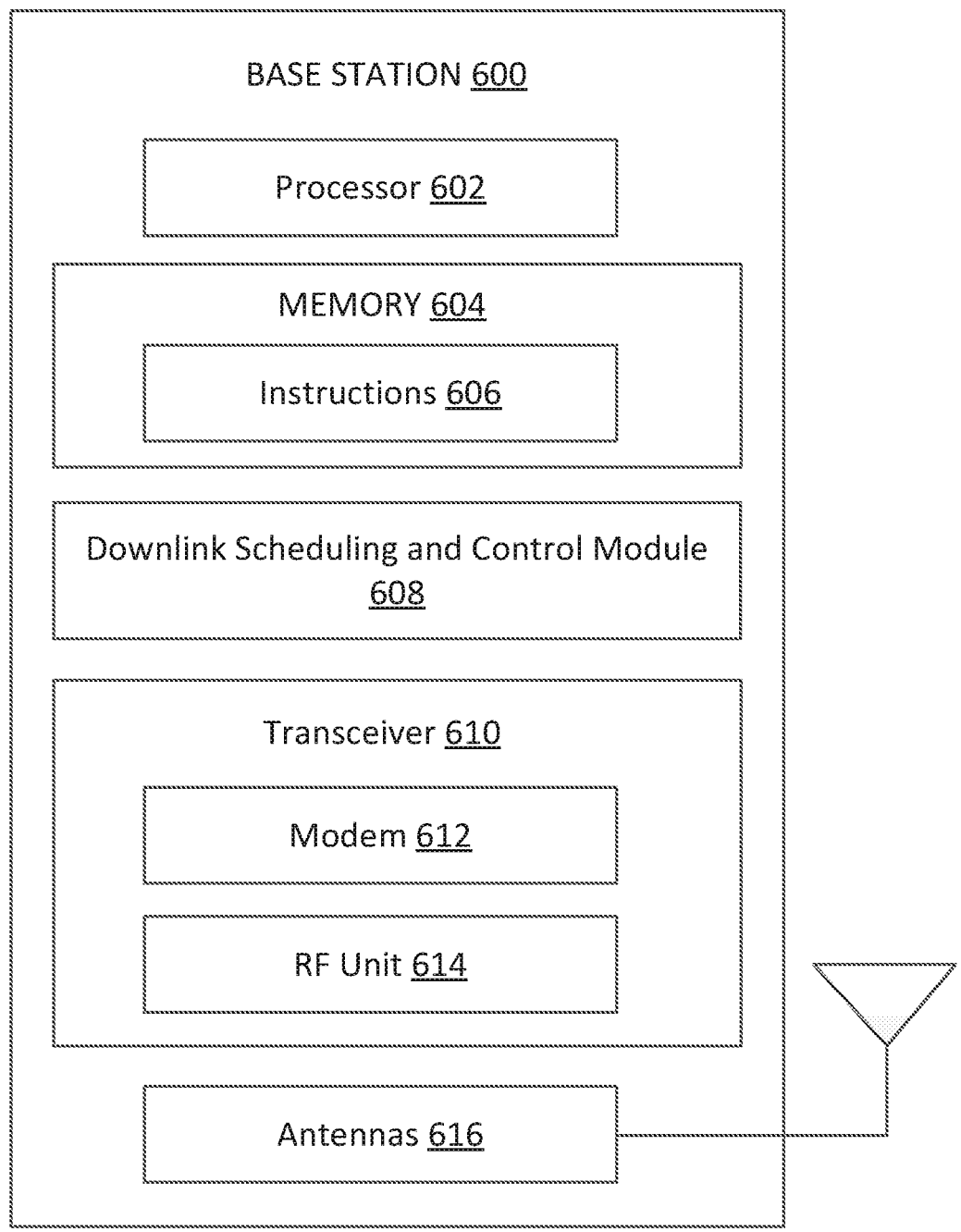
FIG. 6 is a block diagram of an exemplary base station (BS) according to aspects of the present disclosure.

FIG. 6 is a block diagram of an exemplary BS 600 according to aspects of the present disclosure. The BS 600 may be a BS 105 as discussed above in FIG. 1. As shown, the BS 600 may include a processor 602, a memory 604, a downlink scheduling and control module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3, 4, 7, 8, and 10. Instructions 606 may also be referred to as code, which may be interpreted broadly to include any type of computer-readable statement(s) as discussed above with respect to FIG. 5.

The downlink scheduling and control module 608 may be implemented via hardware, software, or combinations thereof. For example, the downlink scheduling and control module 608 may be implemented as a processor, circuit, and/or instructions 606 stored in the memory 604 and executed by the processor 602. In some examples, the downlink scheduling and control module 608 can be integrated within the modem subsystem 612. For example, the downlink scheduling and control module 608 can be implemented by a combination of software components (e.g., executed by a DSP or a general processor) and hardware components (e.g., logic gates and circuitry) within the modem subsystem 612.

The downlink scheduling and control module 608 may be used for various aspects of the present disclosure, for example, aspects of FIGS. 3, 4, 7, 8, and 10. The downlink scheduling and control module 608 can be configured to determine a power saving configuration for one or more UEs, transmit the power saving configuration to the one or more UEs, transmit one or more downlink communication(s) to one or more UEs based on the power saving configuration(s), transmit PDCCH communications, transmit PDSCH communications, determine whether a timer has expired, cancel a timer, determine whether a condition has occurred or is met, and/or perform other functionalities related to the power saving configurations and associated wireless communication techniques of a base station described in the present disclosure.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS (e.g., a LDPC coding scheme, a turbo coding scheme, a convolutional coding scheme, a digital beamforming scheme, etc.). The RF unit 614 may be configured to process (e.g., perform analog to digital conversion or digital to analog conversion, etc.) modulated/encoded data (e.g., PDCCH signals, RRC signals, MAC CE signals, PDSCH signals, etc.) from the modem subsystem 612 (on outbound transmissions) or of transmissions originating from another source, such as a UE 115 or 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, (e.g., data packets or, more generally, data messages that may contain one or more data packets and other information) to the antennas 616 for transmission to one or more other devices. This may include, for example, transmission of information to a UE 115 or 500 according to aspects of the present disclosure. The antennas 616 may further receive data messages transmitted from other devices and provide the received data messages for processing and/or demodulation at the transceiver 610. The transceiver 610 may provide the demodulated and decoded data (e.g., RACH message(s), ACK/NACKs for PDCCH signals, UL data, ACK/NACKs for DL data, etc.) to the downlink scheduling and control module 608 for processing. The antennas 616 may include multiple antennas of similar or different designs in order to sustain multiple transmission links.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement different RATs.

Figure 7:
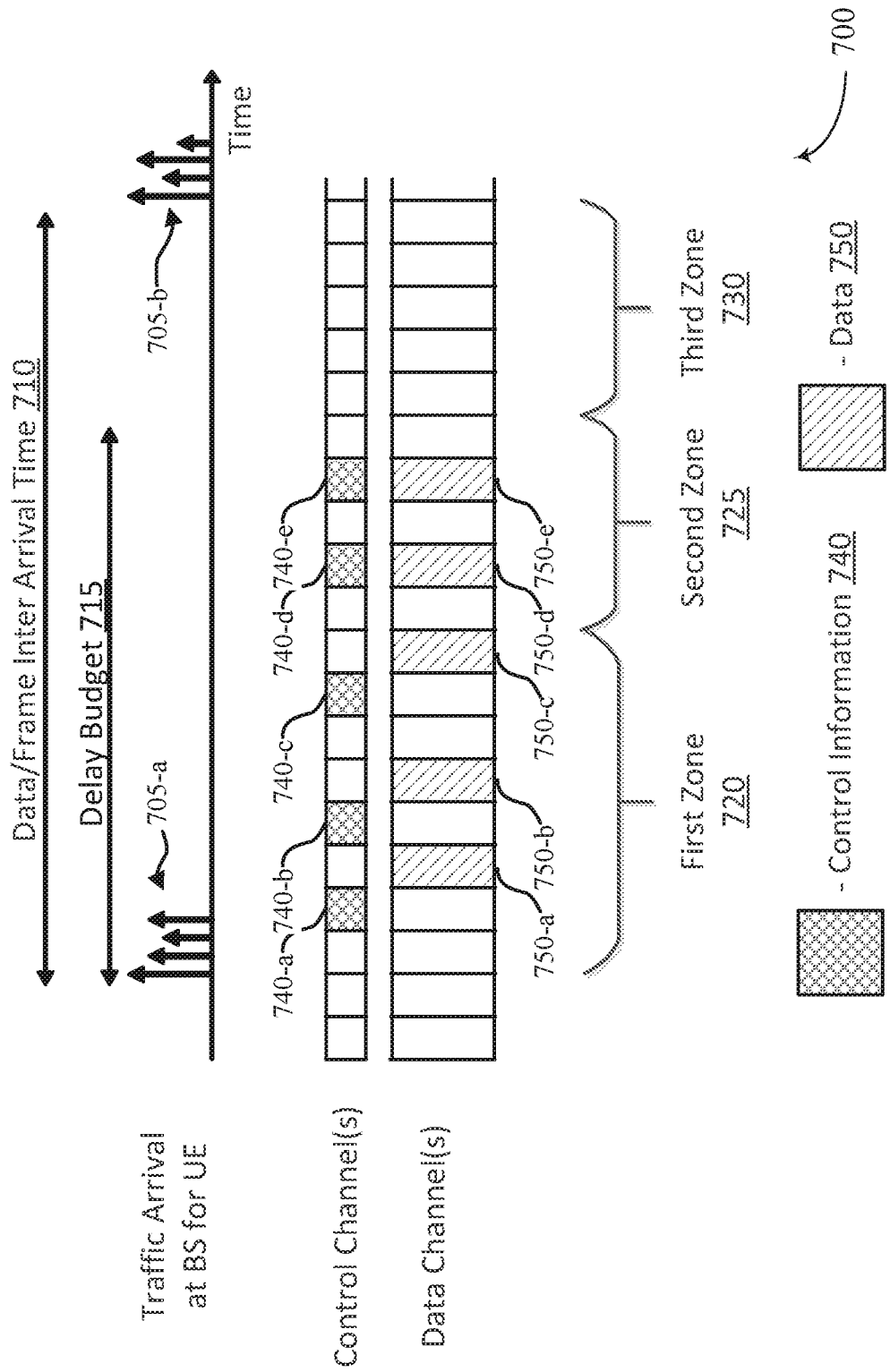
FIG. 7 illustrates a scheduling/transmission configuration of a wireless communication method according to some aspects of the present disclosure.

FIG. 7 illustrates a scheduling/transmission configuration 700 of a wireless communication method according to some aspects of the present disclosure. As shown, data 705-*a* and 705-*b* for a UE (e.g., UEs 115 and/or 500, including XR devices 200) arrives at a base station (e.g., BSs 105 and/or 600). As shown, the data 705-*a* and 705-*b* has a data/frame inter arrival time 710 between the start of the arrival of data 705-*a* and the start of the arrival of data 705-*b*. The data 705-*a* and/or 705-*b* may include a data frame or a data burst that includes multiple slices or components of data. In some instances, the data 705-*a* and 705-*b* is associated with XR downlink traffic. XR downlink traffic can have a quasi-periodic pattern because the underlying data frames are generated quasi-periodically. For example, a frame rate of the XR downlink can be 120 Hz or 60 Hz, which corresponds to the data/frame inter arrival time 710 being 8.3 ms or 16.7 ms, respectively. It is understood that any inter frame inter arrival time 710 may be used, including variable times.

In some instances, the UE is configured to operate in a DRX mode, including a CDRX mode, where a periodicity of the DRX/CDRX cycle matches with the data/frame inter arrival time 710. For example, in some instances the start of an active state of the DRX/CDRX cycle may be time aligned with the start of the arrival of data 705-*a* and/or 705-*b*. In some instances, the periodicity of the DRX/CDRX cycle and/or the active state or sleep state of the DRX/CDRX cycle may be offset with respect to the data/frame inter arrival time 710.

The data 705-*a* can have a delay budget 715. The delay budget 715 can be associated with the latency of the 705-*a*. For example, the delay budget 715 can define the time period in which the UE should receive the data 705-*a* to ensure smooth operation of the underlying application for which the data 705-*a* is for. For example, where the data 705-*a* is XR data the delay budget 715 may be 5 ms (e.g., for 120 HZ/8.3 ms data/frame inter arrival time), 10 ms (e.g., for 60 HZ/16.7 ms data/frame inter arrival time), or other suitable value. In some instances, the delay budget 715 will be less than the data/frame inter arrival time 710. Additionally, in some instances the data 705-*a* should be received within the active state of one DRX/CDRX cycle. Accordingly, in some instances the delay budget 715 may be at least partially based on the DRX/CDRX cycle timing. In some instances, the base station utilizes the traffic (e.g., data 705-*a* and 705-*b*), data/frame inter arrival time 710, delay budget 715, DRX/CDRX cycle timing, and/or other communication parameters for the UE and/or other UEs connected to the base station to determine a power saving configuration for the UE (and/or other UEs connected to the base station). As discussed above with respect to FIGS. 3 and 4, the base station can transmit the power saving configuration to the UE via at least one of a radio resource control (RRC) configuration, downlink control information (DCI), or a media access control control element (MAC-CE). FIG. 7 illustrates downlink communications between the base station and the UE in accordance with the power saving configuration.

In some instances, the power saving configuration indicates one or more zones (e.g., one or more power saving zones, one or more urgent transmission zones, and/or one or more no transmission zones) and associated operating parameters for use by the UE in receiving downlink communications from the base station. In the example shown in FIG. 7, three different zones are illustrated (i.e., a first zone 720, a second zone 725, and a third zone 730). However, it is understood that any number of zones may be used. It is also understood that multiple zones of the same or similar type may be used, including with one or more different operating parameters between the same or similar zone types. The data 705-a may be communicated to the UE in multiple slices over multiple slots that collectively compose a data burst. For example, in the illustrated embodiment of FIG. 7 control information 740 and data 750 are communicated to the UE over multiple slots as indicated by control information 740-a, 740-b, 740-c, 740-d, and 740-e and data 750-a, 750-b, 750-c, 750-d, and 750-e.

In the first zone 720, the UE operates based on the first zone operating parameters as indicated in the power saving configuration. Similarly, the base station performs downlink communication(s) based on the first zone operating parameters. The UE operating parameters of the first zone 720 can include a slot offset, a bandwidth part, a CDRX inactivity timer duration (if the UE is configured with CDRX), etc. The first zone 720 can be a power saving zone and include a set of operating parameters configured to provide power saving to the UE. For example, the first zone 720 may have an offset (e.g., K0>0) between a slot in which scheduling downlink control information 740 is communicated (e.g., over PDCCH) and the slot in which the associated scheduled data 750 is communicated (e.g., over PDSCH). Having a slot offset greater than zero can allow cross-slot scheduling of data transmissions, which can facilitate multiplexing data transmissions for a larger number of simultaneous users (including simultaneous XR users). In the illustrated example, the slot offset in the first zone 720 is shown by the slot in which the control information 740-a, 740-b, and 740-c is communicated being offset from the slot in which the corresponding data 750-a, 750-b, and 750-c is communicated, respectively. In particular, in the illustrated example each slot for the data 750-a, 750-b, and 750-c is offset by one slot relative to the control information 740a, 740-b, and 740-c, respectively. However, it is understood that the offset(s) may be different (e.g., 2, 3, 4, 5, etc.) in other instances.

Further, the first zone 720 may have a bandwidth part that has a smaller bandwidth than a bandwidth part of the second zone 725, for example. Using a smaller bandwidth can allow the UE to monitor for downlink communications using less resources and/or power. Further still, in some instances the first zone 720 includes an inactivity timer value that facilitates power savings. In this regard, the inactivity timer value may be associated with a duration for the UE to stay active for downlink control information monitoring (e.g., over PDCCH). In some instances, the inactivity timer value is associated with a CDRX inactivity timer (e.g., when the UE is configured with CDRX). When the inactivity timer expires, and the UE has not detected any activity, then the UE can enter a sleep mode and/or reduced power state. Accordingly, the first zone 720 may have an inactivity timer value that is smaller/shorter than an inactivity timer value of the second zone 725 to provide additional power savings.

In the second zone 725, the UE operates based on the second zone operating parameters as indicated in the power saving configuration. Similarly, the base station performs downlink communication(s) based on the second zone operating parameters. The UE operating parameters of the second zone 725 can include a slot offset, a bandwidth part, a CDRX inactivity timer duration (e.g., when the UE is configured with CDRX), etc. The second zone 725 can be an urgent transmission zone and include a set of operating parameters configured to ensure the UE receives downlink data communications within any associated latency requirements. For example, the second zone 725 may either have no offset (e.g., K0=0) such that the downlink control information and the associated data are transmitted in the same slot (as illustrated in FIG. 7) or have an offset value less than the offset of a power saving zone (e.g., $K0_{UTZ}<K0_{PSZ}$). Further, the second zone 725 may have a bandwidth part that has a larger bandwidth than a bandwidth part of the first zone 720, for example. Using a larger bandwidth for the bandwidth part of the second zone 725 can help ensure that the downlink communication is successfully received by the UE within the delay budget 715. Further still, in some instances the second zone 725 includes an inactivity timer value that facilitates successful downlink communications. In this regard, the inactivity timer value may be associated with a duration for the UE to stay active for downlink control information monitoring (e.g., over PDCCH). In some instances, the inactivity timer value is associated with a CDRX inactivity timer (e.g., when the UE is configured with CDRX). When the inactivity timer expires, and the UE has not detected any activity, then the UE can enter a sleep mode and/or reduced power state. Accordingly, the second zone 725 may have an inactivity timer value that is larger/longer than an inactivity timer value of the first zone 720 to help ensure that any downlink scheduling (e.g., control information 740-d and/or 740-e) is successfully received by the UE along with the associated data transmission (e.g., data 750-d and/or 750-e) within the delay budget 715 for the data 705-a.

In the third zone 730, the UE operates based on the third zone operating parameters as indicated in the power saving configuration. Similarly, the base station performs downlink communication(s) based on the third zone operating parameters. In some instances, the third zone 730 is a no transmission zone and includes a set of operating parameters associated with the UE operating in a sleep mode. The sleep mode can be a deep sleep, a light sleep, a micro sleep, and/or a combination thereof. Accordingly, in some instances the base station refrains from transmitting downlink communication(s) during the third zone 730, as shown in FIG. 7.

Figure 8A:
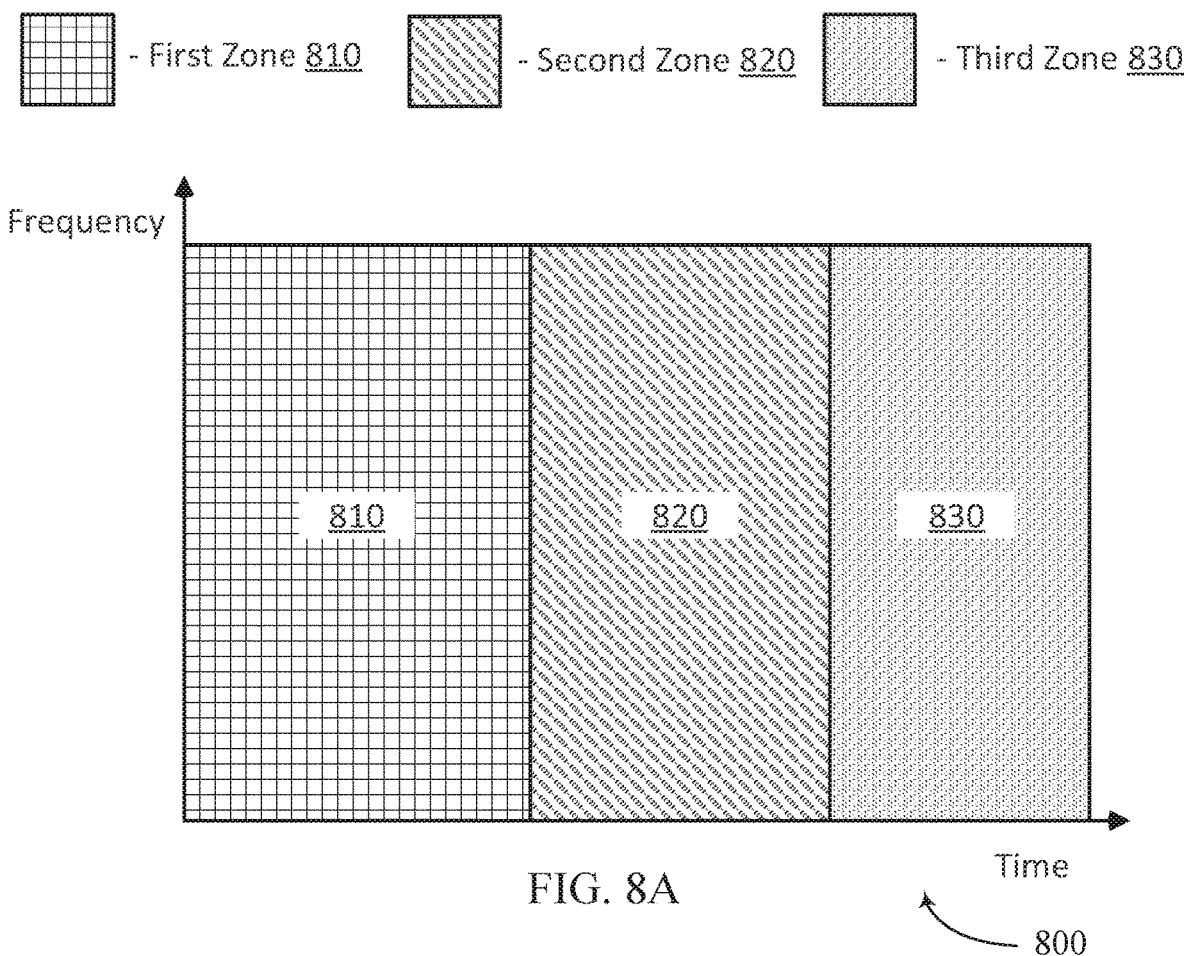
FIG. 8A illustrates a scheduling/transmission configuration of a wireless communication method according to some aspects of the present disclosure.

FIG. 8A illustrates a scheduling/transmission configuration 800 of a wireless communication method according to some aspects of the present disclosure. As shown, the scheduling/transmission configuration 800 illustrates a power saving configuration where a first zone 810, a second zone 820, and a third zone 830 are configured in the time domain. That is, each of the first, second, and third zones 810, 820, and 830 are defined for a particular time period and applicable for a range of operating frequencies. The range of operating frequencies may be associated with one or more operating frequencies of the base station and/or the UE and include all or one or more portions of the operating frequencies, including contiguous and/or non-contiguous portions. The timing of the first zone 810, second zone 820, and/or third zone 830 may be based on communication parameters for the UE and/or one or more other UEs, including the downlink traffic, data/frame inter arrival times, delay budgets, DRX/CDRX cycle timings, and/or other communication parameters. In some instances, the timing of the first zone 810, second zone 820, and/or third zone 830 is determined by the base station and communicated to the UE as part of a power saving configuration.

Figure 8B:
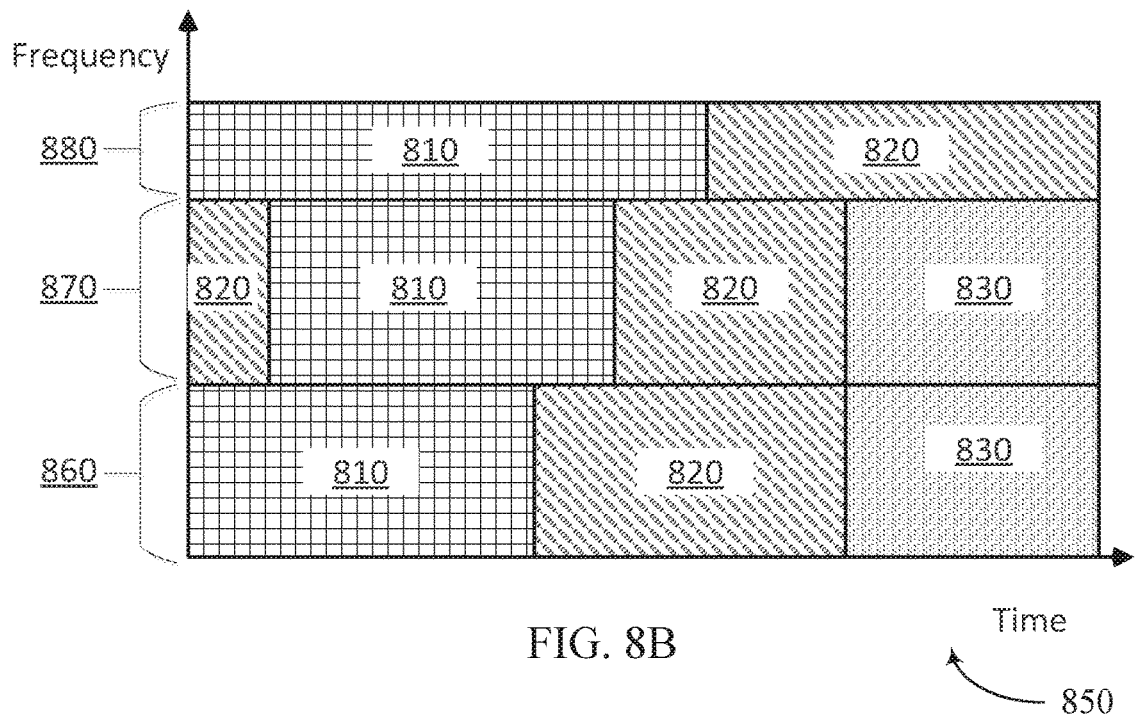
FIG. 8B illustrates a scheduling/transmission configuration of a wireless communication method according to some aspects of the present disclosure.

FIG. 8B illustrates a scheduling/transmission configuration 850 of a wireless communication method according to some aspects of the present disclosure. As shown, the scheduling/transmission configuration 800 illustrates a power saving configuration where the first zone 810, the second zone 820, and the third zone 830 are configured in time and frequency domains. That is, each of the first, second, and third zones 810, 820, and 830 are defined for a particular time period and for a particular range of operating frequencies (e.g., frequency ranges 860, 870, and 880). The frequency ranges 860, 870, and 880 may be associated with one or more operating frequencies of the base station and/or the UE. While the illustrated example shows the frequency ranges 860, 870, and 880 being contiguous ranges, the frequency ranges can be non-contiguous in other instances (e.g., frequency ranges 860 and 880 could collectively define a frequency range). In some instances, the frequency ranges 860, 870, and 880 are determined by the base station and communicated to the UE as part of a power saving configuration. Further, the timing of the first zone 810, second zone 820, and/or third zone 830 within each of the frequency ranges 860, 870, and 880 may be based on communication parameters for the UE and/or one or more other UEs, including the downlink traffic, data/frame inter arrival times, delay budgets, DRX/CDRX cycle timings, and/or other communication parameters. In some instances, the timing of the first zone 810, second zone 820, and/or third zone 830 within each of the frequency ranges 860, 870, and 880 is determined by the base station and communicated to the UE as part of a power saving configuration.

In the illustrated example of FIG. 8B, frequency zone 860 includes the first, second, and third zones 810, 820, and 830 arranged in the time domain in a similar manner to FIG. 8A. Frequency zone 870 includes the second zone 820, followed by the first zone 810, followed by another second zone 820, and then followed by the third zone 830 in the time domain. Frequency zone 880 includes only the first zone 810 followed by the second zone 820. That is, frequency zone 880 does not include the third zone 830. It is understood that the example illustrated in FIG. 8B is non-limiting and that any combination of zones, frequencies, and timings may be utilized within the scope of the present disclosure.

Figure 9:
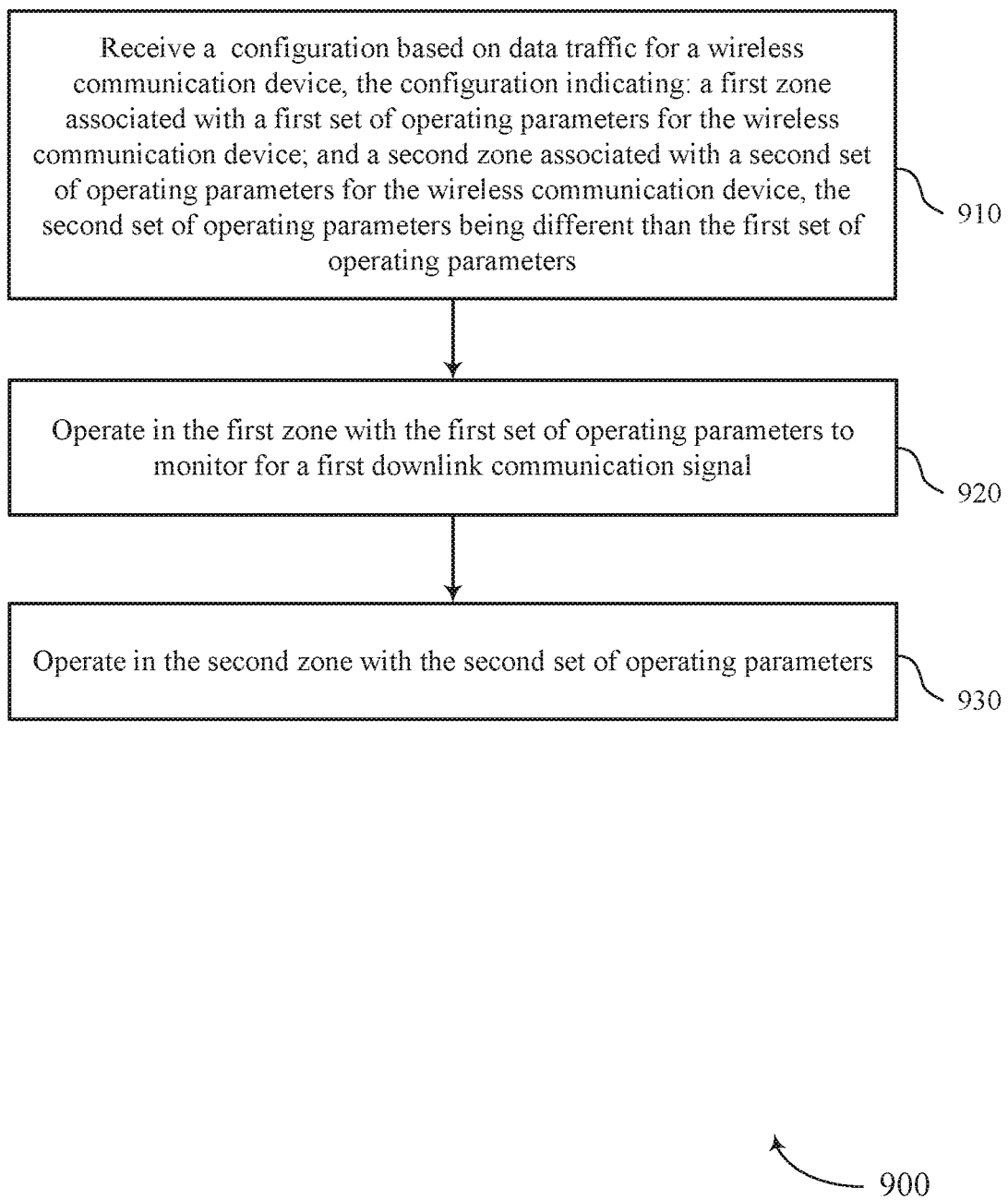
FIG. 9 illustrates a flow diagram of a wireless communication method according to some aspects of the present disclosure.

FIG. 9 is a flow diagram of a communication method 900 according to some aspects of the present disclosure. Aspects of the method 900 can be executed by a wireless communication device, such as the UEs 115 and/or 500 (including XR devices 200) utilizing one or more components, such as the processor 502, the memory 504, the downlink scheduling and control module 508, the transceiver 510, the modem 512, the one or more antennas 516, and various combinations thereof. As illustrated, the method 900 includes a number of enumerated steps, but the method 900 may include additional steps before, after, and in between the enumerated steps. For example, in some instances one or more aspects of technique 300, method 400, and/or scheduling/transmission configurations 800 and/or 850 may be implemented as part of method 900. In some instances, one or more of the enumerated steps may be omitted or performed in a different order.

At step 910, the method 900 includes receiving, while in a connected mode, a configuration based on data traffic for the wireless communication device. The configuration can be received via at least one of a radio resource control (RRC) configuration, downlink control information (DCI), or a media access control control element (MAC-CE). The configuration can indicate a first zone associated with a first set of operating parameters for the wireless communication device and a second zone associated with a second set of operating parameters for the wireless communication device. The second set of operating parameters can be different than the first set of operating parameters. In some instances, the first zone is a power saving zone with corresponding operating parameters that help to conserve power resources of the wireless communication device and the second zone is an urgent transmission zone with corresponding operating parameters that help to ensure latency requirements of a downlink communication signal—including XR downlink communication signals—are satisfied. Each of the first and second zones can be defined based on at least one of a time domain, a frequency domain, or a combination of time and frequency domains (see, e.g., FIGS. 4, 7, 8A, and 8B).

The operating parameters of the first and second zones can include a slot offset, a bandwidth part, a CDRX inactivity timer duration (e.g., when the UE is configured with CDRX), etc. In this regard, the associated values of these operating parameters can be selected to achieve one or more operating goals for the zone, such as power saving and/or ensuring latency requirements are met.

In some instances, the first set of operating parameters includes a first slot offset and the second set of operating parameters includes a second slot offset. The second slot offset can be less than the first slot offset. For example, where the first zone is a power saving zone and the second zone is an urgent transmission zone, the power saving zone may have an offset (e.g., K0>0) between the slot in which the scheduling downlink control information is communicated (e.g., over PDCCH) and the slot in which the associated scheduled data is communicated (e.g., over PDSCH). Having a slot offset greater than zero allows cross-slot scheduling of data transmissions, which can facilitate multiplexing data transmissions for a larger number of simultaneous users (including simultaneous XR users) than only allowing same-slot scheduling. For example, a larger number of downlink data communications—including XR data communications—can be scheduled within the required latency requirements for the communications. Further, the urgent transmission zone may either have no offset (e.g., K0=0) such that the downlink control information and the associated data are transmitted in the same slot or have an offset value less than the offset of the power saving zone (e.g., $K0_{UTZ} < K0_{PSZ}$).

In some instances, the first set of operating parameters includes a first bandwidth and the second set of operating parameters includes a second bandwidth. The second bandwidth can be greater than the first bandwidth. For example, where the first zone is a power saving zone and the second zone is an urgent transmission zone, the power saving zone may have a bandwidth part that has a smaller bandwidth than a bandwidth part of the urgent transmission zone. Using a smaller bandwidth can allow the UE to monitor for communications using less resources and/or power. On the other hand, using a larger bandwidth for the bandwidth part of the urgent transmission zone can help ensure that the downlink communication is successfully received by the UE within the required latency timeframe.

In some instances, the first set of operating parameters includes a first inactivity timer value and the second set of operating parameters includes a second inactivity timer value. The second inactivity timer value can be larger than the first inactivity timer value. For example, in some instances the first and second inactivity timer values are associated with a duration for the UE to stay active for downlink control information monitoring (e.g., over PDCCH). In some instances, the inactivity timer is a CDRX inactivity timer (e.g., when the UE is configured with CDRX). When the inactivity timer expires, and the UE has not detected any activity, then the UE can enter a sleep mode and/or reduced power state. Accordingly, in some instances where the first zone is a power saving zone and the second zone is an urgent transmission zone, the power saving zone may have an inactivity timer value that is smaller than an inactivity timer value of the urgent transmission zone to provide additional power savings. On the other hand, the urgent transmission zone may use a longer inactivity timer value to help ensure that any downlink scheduling is successfully received by the UE (along with the associated data transmission) within the required latency timeframe for the downlink data communication.

At step 920, the method 900 includes operating in the first zone with the first set of operating parameters to monitor for a first downlink communication signal. In some instances, the data traffic can include extended reality (XR) data for the wireless communication device and the first downlink communication signal can include an XR downlink communication signal. In this regard, the configuration—including the associated operating parameters of the first and second zones—may be determined and/or selected based on the XR data for the wireless communication device. In some instances, operating in the first zone includes operating in a power saving zone with a corresponding set of operating parameters (e.g., a slot offset, a bandwidth part, a CDRX inactivity timer duration (e.g., when the UE is configured with CDRX), etc.) as discussed above. Accordingly, in some instances step 920 can include receiving a downlink control signal in a first slot and receiving a downlink data signal in a second, different slot based on a slot offset.

At step 930, the method 900 includes operating in the second zone with the second set of operating parameters. In some instances, operating in the second zone includes operating in an urgent transmission zone with a corresponding set of operating parameters (e.g., a slot offset, a bandwidth part, a CDRX inactivity timer duration (e.g., when the UE is configured with CDRX), etc.) as discussed above. Accordingly, in some instances step 930 can include monitoring for a second downlink communication signal.

In some instances, the wireless communication device is configured for DRX. In such instances, the method 900 can provide additional power savings to the wireless communication device beyond what DRX, including CDRX, can provide alone. In other instances, the wireless communication device is not configured for DRX. In such instances, the method 900 can provide power savings that would not otherwise be available to the wireless communication device.

In some instances, the configuration received at step 910 further indicates a third zone associated with a sleep mode for the wireless communication device. The configuration can also indicate that one or more of the first zone, the second zone, or the third zone occurs during an active time of a connected mode discontinuous reception (CDRX) cycle of the wireless communication device. The configuration can further indicate that at least one of the first zone or the second zone is time aligned with a beginning of the active time of the CDRX cycle. The configuration can also indicate that the third zone is configured to cause an early termination of the active time of the CDRX cycle. The configuration can be specific to a wireless communication device and/or a group of wireless communication devices. Further, the configuration for a particular wireless communication device or group of wireless communication devices may be changed or updated dynamically (e.g., for each data frame or set of data frames, upon occurrence of a predetermined event, at the discretion and/or timing of the base station, etc.), semi-statically (e.g., indicated zones and/or operating parameters are maintained until an updated configuration is received and/or a trigger event occurs), periodically (e.g., updated based on a predefined schedule or timer), and/or a combination thereof. In some instances, the configuration is based on XR data traffic for the wireless communication device and utilized by the wireless communication device for XR data reception.

Figure 10:
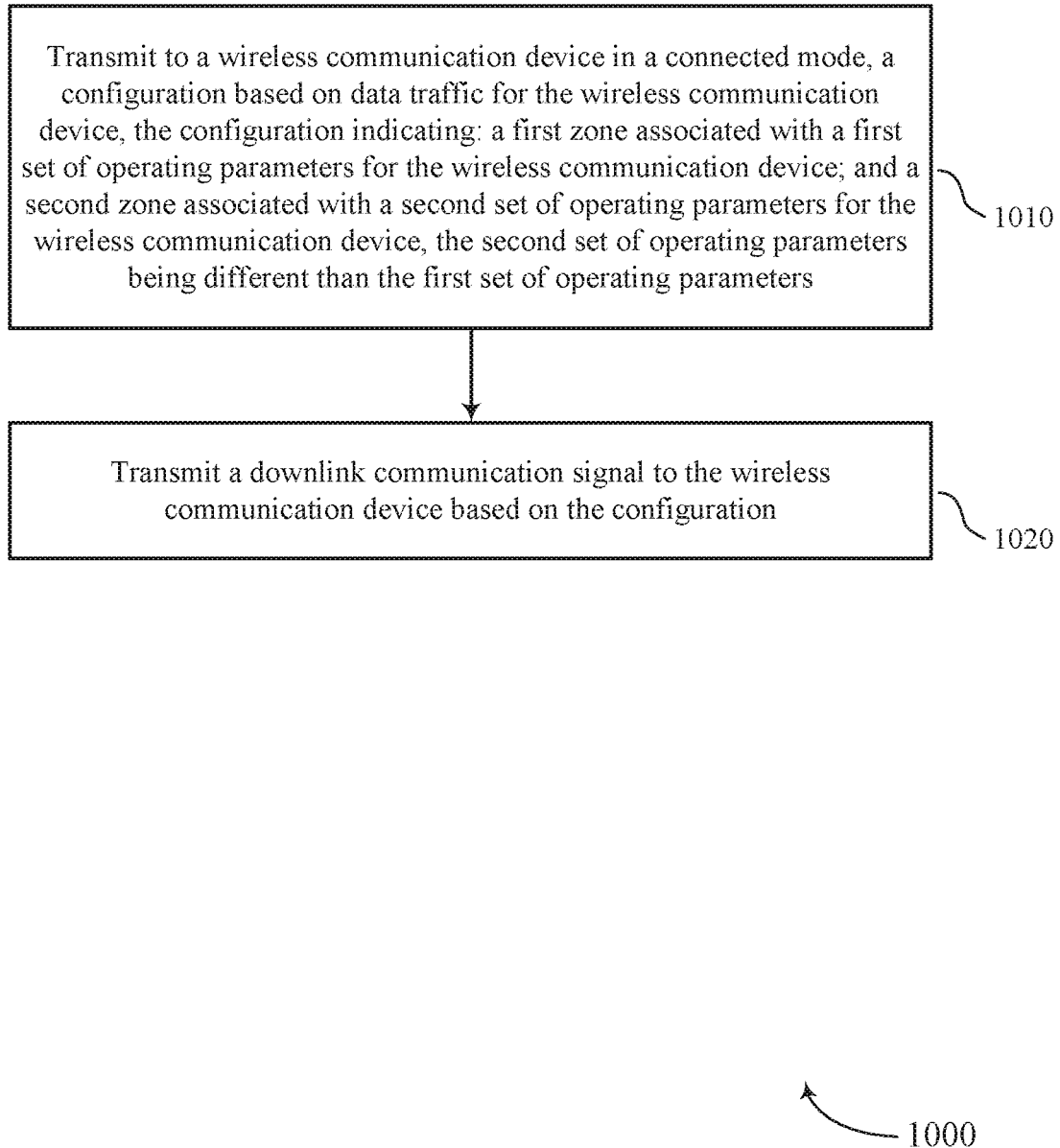
FIG. 10 illustrates a flow diagram of a wireless communication method according to some aspects of the present disclosure.

FIG. 10 is a flow diagram of a communication method 1000 according to some aspects of the present disclosure. Aspects of the method 1000 can be executed by a wireless communication device, such as the BSs 105 and/or 600 utilizing one or more components, such as the processor 602, the memory 604, the downlink scheduling and control module 608, the transceiver 610, the modem 612, the one or more antennas 616, and various combinations thereof. As illustrated, the method 1000 includes a number of enumerated steps, but the method 1000 may include additional steps before, after, and in between the enumerated steps. For example, in some instances one or more aspects of technique 300, method 400, and/or scheduling/transmission configurations 800 and/or 850 may be implemented as part of method 1000. In some instances, one or more of the enumerated steps may be omitted or performed in a different order.

At step 1010, the method 1000 includes transmitting, to a wireless communication device in a connected mode, a configuration based on data traffic for the wireless communication device. The configuration can be transmitted via at least one of a radio resource control (RRC) configuration, downlink control information (DCI), or a media access control control element (MAC-CE). The configuration can indicate a first zone associated with a first set of operating parameters for the wireless communication device and a second zone associated with a second set of operating parameters for the wireless communication device. The second set of operating parameters can be different than the first set of operating parameters. In some instances, the first zone is a power saving zone with corresponding operating parameters that help to conserve power resources of the wireless communication device and the second zone is an urgent transmission zone with corresponding operating parameters that help to ensure latency requirements of a downlink communication signal—including XR downlink communication signals—are satisfied. Each of the first and second zones can be defined based on at least one of a time domain, a frequency domain, or a combination of time and frequency domains (see, e.g., FIGS. 4, 7, 8A, and 8B).

The operating parameters of the first and second zones can include a slot offset, a bandwidth part, a CDRX inactivity timer duration (e.g., when the UE is configured with CDRX), etc. In this regard, the associated values of these operating parameters can be selected to achieve one or more operating goals for the zone, such as power saving and/or ensuring latency requirements are met.

In some instances, the first set of operating parameters includes a first slot offset and the second set of operating parameters includes a second slot offset. The second slot offset can be less than the first slot offset. For example, where the first zone is a power saving zone and the second zone is an urgent transmission zone, the power saving zone may have an offset (e.g., K0>0) between the slot in which the scheduling downlink control information is communicated (e.g., over PDCCH) and the slot in which the associated scheduled data is communicated (e.g., over PDSCH). Having a slot offset greater than zero allows cross-slot scheduling of data transmissions, which can facilitate multiplexing data transmissions for a larger number of simultaneous users (including simultaneous XR users) than only allowing same-slot scheduling. For example, a larger number of downlink data communications—including XR data communications—can be scheduled within the required latency requirements for the communications. Further, the urgent transmission zone may either have no offset (e.g., K0=0) such that the downlink control information and the associated data are transmitted in the same slot or have an offset value less than the offset of the power saving zone (e.g., $K0_{UTZ} < K0_{PSZ}$).

In some instances, the first set of operating parameters includes a first bandwidth and the second set of operating parameters includes a second bandwidth. The second bandwidth can be greater than the first bandwidth. For example, where the first zone is a power saving zone and the second zone is an urgent transmission zone, the power saving zone may have a bandwidth part that has a smaller bandwidth than a bandwidth part of the urgent transmission zone. Using a smaller bandwidth can allow the UE to monitor for communications using less resources and/or power. On the other hand, using a larger bandwidth for the bandwidth part of the urgent transmission zone can help ensure that the downlink communication is successfully received by the UE within the required latency timeframe.

In some instances, the first set of operating parameters includes a first inactivity timer value and the second set of operating parameters includes a second inactivity timer value. The second inactivity timer value can be larger than the first inactivity timer value. For example, in some instances the first and second inactivity timer values are associated with a duration for the UE to stay active for downlink control information monitoring (e.g., over PDCCH). In some instances, the inactivity timer is a CDRX inactivity timer (e.g., when the UE is configured with CDRX). When the inactivity timer expires, and the UE has not detected any activity, then the UE can enter a sleep mode and/or reduced power state. Accordingly, in some instances where the first zone is a power saving zone and the second zone is an urgent transmission zone, the power saving zone may have an inactivity timer value that is smaller than an inactivity timer value of the urgent transmission zone to provide additional power savings. On the other hand, the urgent transmission zone may use a longer inactivity timer value to help ensure that any downlink scheduling is successfully received by the UE (along with the associated data transmission) within the required latency timeframe for the downlink data communication.

At step 1020, the method 1000 includes transmitting a downlink communication signal to the wireless communication device based on the configuration. In some instances, the data traffic can include extended reality (XR) data for the wireless communication device and the first downlink communication signal can include an XR downlink communication signal. In this regard, the configuration—including the associated operating parameters of the first and second zones—may be determined and/or selected by the base station based on the XR data for the wireless communication device. In some instances, step 920 can include transmitting, in the first zone, a downlink control signal in a first slot and transmitting, in the first zone, a downlink data signal in a second, different slot based on a slot offset. In some instances, step 920 can further include transmitting, in the second zone, a further downlink data signal.

In some instances, the wireless communication device is configured for DRX. In such instances, the method 1000 can provide additional power savings to the wireless communication device beyond what DRX, including CDRX, can provide alone. In other instances, the wireless communication device is not configured for DRX. In such instances, the method 1000 can provide power savings that would not otherwise be available to the wireless communication device.

In some instances, the configuration transmitted at step 1010 further indicates a third zone associated with a sleep mode for the wireless communication device. Accordingly, in some instances transmitting the downlink communication signal to the wireless communication device based on the configuration includes the base station refraining from transmitting the downlink communication signal during the third zone The configuration can also indicate that one or more of the first zone, the second zone, or the third zone occurs during an active time of a connected mode discontinuous reception (CDRX) cycle of the wireless communication device. The configuration can further indicate that at least one of the first zone or the second zone is time aligned with a beginning of the active time of the CDRX cycle. The configuration can also indicate that the third zone is configured to cause an early termination of the active time of the CDRX cycle.

The configuration can be specific to a particular wireless communication device and/or a group of wireless communication devices. Further, the configuration for a particular wireless communication device or group of wireless communication devices may be changed or updated by the base station dynamically (e.g., for each data frame or set of data frames, upon occurrence of a predetermined event, at the discretion and/or timing of the base station, etc.), semi-statically (e.g., indicated zones and/or operating parameters are maintained until an updated configuration is received and/or a trigger event occurs), periodically (e.g., updated based on a predefined schedule or timer), and/or a combination thereof.

In some instances, the method 1000 further includes determining and/or selecting the configuration and/or one or more of the operating parameters for each of the operating zones by the base station. In some instances, the configuration is based on data traffic, including XR data traffic, for the wireless communication device and/or one or more other wireless communication devices connected to the base station. Once the configuration (with associated zones and operating parameters) has been determined and/or selected by the base station, the base station communicates the configuration to the wireless communication device for use in data reception, including XR data reception. In this regard, the base station may schedule downlink communications to the wireless communication device in accordance with the operating parameters of each of the operating zones as indicated in the configuration.

Further aspects of the present disclosure include the following:

1. A method of wireless communication performed by a wireless communication device, the method comprising:
   receiving, while in a connected mode, a configuration based on data traffic for the wireless communication device, the configuration indicating:
      a first zone associated with a first set of operating parameters for the wireless communication device; and
      a second zone associated with a second set of operating parameters for the wireless communication device, the second set of operating parameters being different than the first set of operating parameters;
   operating in the first zone with the first set of operating parameters to monitor for a first downlink communication signal; and
   operating in the second zone with the second set of operating parameters.
2. The method of clause 1, wherein the data traffic includes extended reality (XR) data and wherein the first downlink communication signal is an XR downlink communication signal.
3. The method of any of clauses 1-2, wherein the wireless communication device is configured for discontinuous reception (DRX).
4. The method of any of clauses 1-2, wherein the wireless communication device is not configured for discontinuous reception (DRX).
5. The method of any of clauses 1-4, wherein each of the first zone and the second zone are defined based on at least one of a time domain, a frequency domain, or a combination of time and frequency domains.
6. The method of any of clauses 1-5, wherein the first set of operating parameters includes a first slot offset and the second set of operating parameters includes a second slot offset, the second slot offset being less than the first slot offset.
7. The method of any of clauses 1-6, wherein the first set of operating parameters includes a first bandwidth and the second set of operating parameters includes a second bandwidth, the second bandwidth being greater than the first bandwidth.
8. The method of any of clauses 1-7, wherein the first set of operating parameters includes a first inactivity timer value and the second set of operating parameters includes a second inactivity timer value, the second inactivity timer value being larger than the first inactivity timer value.
9. The method of any of clauses 1-8, wherein the operating in the first zone with the first set of operating parameters includes:
   receiving a downlink control signal in a first slot; and
   receiving a downlink data signal in a second slot, the second slot being different than the first slot.
10. The method of any of clauses 1-9, wherein the operating in the second zone with the second set of operating parameters includes monitoring for a second downlink communication signal.
11. The method of any of clauses 1-9, wherein the configuration further indicates a third zone associated with a sleep mode for the wireless communication device.
12. The method of clause 11, wherein the configuration indicates that one or more of the first zone, the second zone, or the third zone occurs during an active time of a connected mode discontinuous reception (CDRX) cycle of the wireless communication device.
13. The method of clause 12, wherein at least one of the first zone or the second zone is time aligned with a beginning of the active time of the CDRX cycle.
14. The method of any of clauses 12-13, wherein the third zone is configured to cause an early termination of the active time of the CDRX cycle.
15. The method of any of clauses 1-14, wherein the configuration is specific to the wireless communication device for XR data reception.
16. The method of any of clauses 1-15, wherein the receiving the configuration includes receiving at least one of a radio resource control (RRC) configuration, downlink control information (DCI), or a media access control control element (MAC-CE).
17. A method of wireless communication performed by a base station, the method comprising:
   transmitting, to a wireless communication device in a connected mode, a configuration based on data traffic for the wireless communication device, the configuration indicating:
      a first zone associated with a first set of operating parameters for the wireless communication device; and
      a second zone associated with a second set of operating parameters for the wireless communication device, the second set of operating parameters being different than the first set of operating parameters; and
   transmitting a downlink communication signal to the wireless communication device based on the configuration.
18. The method of clause 17, wherein the data traffic includes extended reality (XR) data and wherein the first downlink communication signal is an XR downlink communication signal.
19. The method of any of clauses 17-18, wherein the configuration is further based on the wireless communication device being configured for discontinuous reception (DRX).
20. The method of any of clauses 17-18, wherein the configuration is further based on the wireless communication device not being configured for discontinuous reception (DRX).
21. The method of any of clauses 17-20, wherein each of the first zone and the second zone are defined based on at least one of a time domain, a frequency domain, or a combination of time and frequency domains.
22. The method of any of clauses 17-21, wherein the first set of operating parameters includes a first slot offset and the second set of operating parameters includes a second slot offset, the second slot offset being less than the first slot offset.
23. The method of any of clauses 17-22, wherein the first set of operating parameters includes a first bandwidth and the second set of operating parameters includes a second bandwidth, the second bandwidth being greater than the first bandwidth.
24. The method of any of clauses 17-23, wherein the first set of operating parameters includes a first inactivity timer value and the second set of operating parameters includes a second inactivity timer value, the second inactivity timer value being larger than the first inactivity timer value.

25. The method of any of clauses 17-24, wherein the transmitting the downlink communication signal to the wireless communication device based on the configuration includes:
- transmitting, in the first zone, a downlink control signal in a first slot; and
- transmitting, in the first zone, a downlink data signal in a second slot, the second slot being different than the first slot.

26. The method of any of clauses 17-25, wherein the transmitting the downlink communication signal to the wireless communication device based on the configuration includes:
- transmitting, in the second zone, a further downlink data signal.

27. The method of any of clauses 17-26, wherein:
- the configuration further indicates a third zone associated with a sleep mode for the XR wireless communication device; and
- the transmitting the downlink communication signal to the wireless communication device based on the configuration includes refraining from transmitting the downlink communication signal during the third zone.

28. The method of clause 27, wherein the configuration indicates that one or more of the first zone, the second zone, or the third zone occurs during an active time of a connected mode discontinuous reception (CDRX) cycle of the wireless communication device.

29. The method of clause 28, wherein at least one of the first zone or the second zone is time aligned with a beginning of the active time of the CDRX cycle.

30. The method of any of clauses 28-29, wherein the third zone is configured to cause an early termination of the active time of the CDRX cycle.

31. The method of any of clauses 17-30, wherein the configuration is specific to the wireless communication device for XR data reception.

32. The method of any of clauses 17-31, wherein the transmitting the configuration includes transmitting at least one of a radio resource control (RRC) configuration, downlink control information (DCI), or a media access control control element (MAC-CE).

33. A wireless communication device, comprising:
- a receiver configured to:
  - receive, while in a connected mode, a configuration based on data traffic for the wireless communication device, the configuration indicating:
    - a first zone associated with a first set of operating parameters for the wireless communication device; and
    - a second zone associated with a second set of operating parameters for the wireless communication device, the second set of operating parameters being different than the first set of operating parameters;
- a processor in communication with the receiver, the processor configured to cause the wireless communication device to:
  - operate in the first zone with the first set of operating parameters to monitor for a first downlink communication signal; and
  - operate in the second zone with the second set of operating parameters.

34. The wireless communication device of clause 33, wherein the data traffic includes extended reality (XR) data and wherein the first downlink communication signal is an XR downlink communication signal.

35. The wireless communication device of any of clauses 33-34, wherein the processor is further configured to cause the wireless communication device to operate in a discontinuous reception (DRX) mode.

36. The wireless communication device of any of clauses 33-34, wherein the processor is not configured to cause the wireless communication device to operate in a discontinuous reception (DRX) mode.

37. The wireless communication device of any of clauses 33-36, wherein each of the first zone and the second zone are defined based on at least one of a time domain, a frequency domain, or a combination of time and frequency domains.

38. The wireless communication device of any of clauses 33-37, wherein the first set of operating parameters includes a first slot offset and the second set of operating parameters includes a second slot offset, the second slot offset being less than the first slot offset.

39. The wireless communication device of any of clauses 33-38, wherein the first set of operating parameters includes a first bandwidth and the second set of operating parameters includes a second bandwidth, the second bandwidth being greater than the first bandwidth.

40. The wireless communication device of any of clauses 33-39, wherein the first set of operating parameters includes a first inactivity timer value and the second set of operating parameters includes a second inactivity timer value, the second inactivity timer value being larger than the first inactivity timer value.

41. The wireless communication device of any of clauses 33-40, wherein the receiver is further configured to:
- receive a downlink control signal in a first slot of the first zone; and
- receive a downlink data signal in a second slot of the first zone, the second slot being different than the first slot.

42. The wireless communication device of any of clauses 33-41, wherein the processor is further configured to cause the wireless communication device to monitor for a second downlink communication signal in the second zone.

43. The wireless communication device of any of clauses 33-42, wherein the configuration further indicates a third zone associated with a sleep mode for the wireless communication device and wherein the processor is further configured to cause the wireless communication device to operate in the sleep mode in the third zone.

44. The wireless communication device of clause 43, wherein the configuration indicates that one or more of the first zone, the second zone, or the third zone occurs during an active time of a connected mode discontinuous reception (CDRX) cycle of the wireless communication device.

45. The wireless communication device of clause 44, wherein at least one of the first zone or the second zone is time aligned with a beginning of the active time of the CDRX cycle.

46. The wireless communication device of any of clauses 44-45, wherein the processor is further configured to cause an early termination of the active time of the CDRX cycle based on the third zone.

47. The wireless communication device of any of clauses 33-46, wherein the configuration is specific to the wireless communication device for XR data reception.

48. The wireless communication device of any of clauses 33-47, wherein the receiver is configured to receive the configuration by receiving at least one of a radio resource control (RRC) configuration, downlink control information (DCI), or a media access control control element (MAC-CE).

49. An apparatus, comprising:
a transmitter configured to:
transmit, to a wireless communication device in a connected mode, a configuration based on data traffic for the wireless communication device, the configuration indicating:
a first zone associated with a first set of operating parameters for the wireless communication device; and
a second zone associated with a second set of operating parameters for the wireless communication device, the second set of operating parameters being different than the first set of operating parameters; and
transmit a downlink communication signal to the wireless communication device based on the configuration.

50. The apparatus of clause 49, wherein the data traffic includes extended reality (XR) data and wherein the first downlink communication signal is an XR downlink communication signal.

51. The apparatus of any of clauses 49-50, wherein the configuration is further based on the wireless communication device being configured for discontinuous reception (DRX).

52. The apparatus of any of clauses 49-50, wherein the configuration is further based on the wireless communication device not being configured for discontinuous reception (DRX).

53. The apparatus of any of clauses 49-52, wherein each of the first zone and the second zone are defined based on at least one of a time domain, a frequency domain, or a combination of time and frequency domains.

54. The apparatus of any of clauses 49-53, wherein the first set of operating parameters includes a first slot offset and the second set of operating parameters includes a second slot offset, the second slot offset being less than the first slot offset.

55. The apparatus of any of clauses 49-54, wherein the first set of operating parameters includes a first bandwidth and the second set of operating parameters includes a second bandwidth, the second bandwidth being greater than the first bandwidth.

56. The apparatus of any of clauses 49-55, wherein the first set of operating parameters includes a first inactivity timer value and the second set of operating parameters includes a second inactivity timer value, the second inactivity timer value being larger than the first inactivity timer value.

57. The apparatus of any of clauses 49-56, wherein the transmitter is further configured to:
transmit, in the first zone, a downlink control signal in a first slot; and
transmit, in the first zone, a downlink data signal in a second slot, the second slot being different than the first slot.

58. The apparatus of any of clauses 49-57, wherein the transmitter is further configured to:
transmit, in the second zone, a further downlink data signal.

59. The apparatus of any of clauses 49-58, wherein:
the configuration further indicates a third zone associated with a sleep mode for the XR wireless communication device; and
the transmitter is further configured to refrain from transmitting the downlink communication signal during the third zone.

60. The apparatus of clause 59, wherein the configuration indicates that one or more of the first zone, the second zone, or the third zone occurs during an active time of a connected mode discontinuous reception (CDRX) cycle of the wireless communication device.

61. The apparatus of clause 60, wherein at least one of the first zone or the second zone is time aligned with a beginning of the active time of the CDRX cycle.

62. The apparatus of any of clauses 60-61, wherein the third zone is configured to cause an early termination of the active time of the CDRX cycle.

63. The apparatus of any of clauses 49-62, wherein the configuration is specific to the wireless communication device for XR data reception.

64. The apparatus of any of clauses 49-63, wherein the transmitter is configured to transmit the configuration by transmitting at least one of a radio resource control (RRC) configuration, downlink control information (DCI), or a media access control control element (MAC-CE).

65. A wireless communication device, comprising:
means for receiving, while in a connected mode, a configuration based on data traffic for the wireless communication device, the configuration indicating:
a first zone associated with a first set of operating parameters for the wireless communication device; and
a second zone associated with a second set of operating parameters for the wireless communication device, the second set of operating parameters being different than the first set of operating parameters;
means for operating in the first zone with the first set of operating parameters to monitor for a first downlink communication signal; and
means for operating in the second zone with the second set of operating parameters.

66. The wireless communication device of clause 65, wherein the data traffic includes extended reality (XR) data and wherein the first downlink communication signal is an XR downlink communication signal.

67. The wireless communication device of any of clauses 65-66, wherein the wireless communication device further includes means for discontinuous reception (DRX).

68. The wireless communication device of any of clauses 65-66, wherein the wireless communication device does not include means for discontinuous reception (DRX).

69. The wireless communication device of any of clauses 65-68, wherein each of the first zone and the second zone are defined based on at least one of a time domain, a frequency domain, or a combination of time and frequency domains.

70. The wireless communication device of any of clauses 65-69, wherein the first set of operating parameters includes a first slot offset and the second set of operating parameters includes a second slot offset, the second slot offset being less than the first slot offset.

71. The wireless communication device of any of clauses 65-70, wherein the first set of operating parameters includes a first bandwidth and the second set of operating parameters includes a second bandwidth, the second bandwidth being greater than the first bandwidth.
72. The wireless communication device of any of clauses 65-71, wherein the first set of operating parameters includes a first inactivity timer value and the second set of operating parameters includes a second inactivity timer value, the second inactivity timer value being larger than the first inactivity timer value.
73. The wireless communication device of any of clauses 65-72, wherein the means for operating in the first zone with the first set of operating parameters includes:
    means for receiving a downlink control signal in a first slot; and
    means for receiving a downlink data signal in a second slot, the second slot being different than the first slot.
74. The wireless communication device of any of clauses 65-73, wherein the means for operating in the second zone with the second set of operating parameters includes means for monitoring for a second downlink communication signal.
75. The wireless communication device of any of clauses 65-74, wherein the configuration further indicates a third zone associated with a sleep mode for the wireless communication device.
76. The wireless communication device of any of clauses 75, wherein the configuration indicates that one or more of the first zone, the second zone, or the third zone occurs during an active time of a connected mode discontinuous reception (CDRX) cycle of the wireless communication device.
77. The wireless communication device of clause 76, wherein at least one of the first zone or the second zone is time aligned with a beginning of the active time of the CDRX cycle.
78. The wireless communication device of any of clauses 76-77, wherein the third zone is configured to cause an early termination of the active time of the CDRX cycle.
79. The wireless communication device of any of clauses 65-78, wherein the configuration is specific to the wireless communication device for XR data reception.
80. The wireless communication device of any of clauses 65-79, wherein the means for receiving the configuration includes means for receiving at least one of a radio resource control (RRC) configuration, downlink control information (DCI), or a media access control control element (MAC-CE).
81. A base station, comprising:
    means for transmitting, to a wireless communication device in a connected mode, a configuration based on data traffic for the wireless communication device, the configuration indicating:
        a first zone associated with a first set of operating parameters for the wireless communication device; and
        a second zone associated with a second set of operating parameters for the wireless communication device, the second set of operating parameters being different than the first set of operating parameters; and
    means for transmitting a downlink communication signal to the wireless communication device based on the configuration.
82. The base station of clause 81, wherein the data traffic includes extended reality (XR) data and wherein the first downlink communication signal is an XR downlink communication signal.
83. The base station of any of clauses 81-82, wherein the configuration is further based on the wireless communication device being configured for discontinuous reception (DRX).
84. The base station of any of clauses 81-82, wherein the configuration is further based on the wireless communication device not being configured for discontinuous reception (DRX).
85. The base station of any of clauses 81-85, wherein each of the first zone and the second zone are defined based on at least one of a time domain, a frequency domain, or a combination of time and frequency domains.
86. The base station of any of clauses 81-85, wherein the first set of operating parameters includes a first slot offset and the second set of operating parameters includes a second slot offset, the second slot offset being less than the first slot offset.
87. The base station of any of clauses 81-86, wherein the first set of operating parameters includes a first bandwidth and the second set of operating parameters includes a second bandwidth, the second bandwidth being greater than the first bandwidth.
88. The base station of any of clauses 81-87, wherein the first set of operating parameters includes a first inactivity timer value and the second set of operating parameters includes a second inactivity timer value, the second inactivity timer value being larger than the first inactivity timer value.
89. The base station of any of clauses 81-88, wherein the means for transmitting the downlink communication signal to the wireless communication device based on the configuration includes:
    means for transmitting, in the first zone, a downlink control signal in a first slot; and
    means for transmitting, in the first zone, a downlink data signal in a second slot, the second slot being different than the first slot.
90. The base station of any of clauses 81-89, wherein the means for transmitting the downlink communication signal to the wireless communication device based on the configuration includes:
    means for transmitting, in the second zone, a further downlink data signal.
91. The base station of any of clauses 81-90, wherein:
    the configuration further indicates a third zone associated with a sleep mode for the XR wireless communication device; and
    the means for transmitting the downlink communication signal to the wireless communication device based on the configuration includes means for refraining from transmitting the downlink communication signal during the third zone.
92. The base station of clause 91, wherein the configuration indicates that one or more of the first zone, the second zone, or the third zone occurs during an active time of a connected mode discontinuous reception (CDRX) cycle of the wireless communication device.
93. The base station of clause 92, wherein at least one of the first zone or the second zone is time aligned with a beginning of the active time of the CDRX cycle.
94. The base station of any of clauses 92-93, wherein the third zone is configured to cause an early termination of the active time of the CDRX cycle.

95. The base station of any of clauses 81-94, wherein the configuration is specific to the wireless communication device for XR data reception.

96. The base station of any of clauses 81-95, wherein the means for transmitting the configuration includes means for transmitting at least one of a radio resource control (RRC) configuration, downlink control information (DCI), or a media access control control element (MAC-CE).

97. A non-transitory computer-readable medium having program code recorded thereon for wireless communication by a wireless communication device, the program code comprising:
  code for causing the wireless communication device to receive, while in a connected mode, a configuration based on data traffic for the wireless communication device, the configuration indicating:
    a first zone associated with a first set of operating parameters for the wireless communication device; and
    a second zone associated with a second set of operating parameters for the wireless communication device, the second set of operating parameters being different than the first set of operating parameters;
  code for causing the wireless communication device to operate in the first zone with the first set of operating parameters to monitor for a first downlink communication signal; and
  code for causing the wireless communication device to operate in the second zone with the second set of operating parameters.

98. The non-transitory computer-readable medium of clause 97, wherein the data traffic includes extended reality (XR) data and wherein the first downlink communication signal is an XR downlink communication signal.

99. The non-transitory computer-readable medium of any of clauses 97-98, further comprising:
  code for causing the wireless communication device to operate in a discontinuous reception (DRX) mode.

100. The non-transitory computer-readable medium of any of clauses 97-98, wherein the programmable code does not include code for causing the wireless communication device to operate in a discontinuous reception (DRX) mode.

101. The non-transitory computer-readable medium of any of clauses 97-100, wherein each of the first zone and the second zone are defined based on at least one of a time domain, a frequency domain, or a combination of time and frequency domains.

102. The non-transitory computer-readable medium of any of clauses 97-101, wherein the first set of operating parameters includes a first slot offset and the second set of operating parameters includes a second slot offset, the second slot offset being less than the first slot offset.

103. The non-transitory computer-readable medium of any of clauses 97-102, wherein the first set of operating parameters includes a first bandwidth and the second set of operating parameters includes a second bandwidth, the second bandwidth being greater than the first bandwidth.

104. The non-transitory computer-readable medium of any of clauses 97-103, wherein the first set of operating parameters includes a first inactivity timer value and the second set of operating parameters includes a second inactivity timer value, the second inactivity timer value being larger than the first inactivity timer value.

105. The non-transitory computer-readable medium of any of clauses 97-104, wherein the code for causing the wireless communication device to operate in the first zone with the first set of operating parameters includes:
  code for causing the wireless communication device to receive a downlink control signal in a first slot; and
  code for causing the wireless communication device to receive a downlink data signal in a second slot, the second slot being different than the first slot.

106. The non-transitory computer-readable medium of any of clauses 97-105, wherein the code for causing the wireless communication device to operate in the second zone with the second set of operating parameters includes code for causing the wireless communication device to monitor for a second downlink communication signal.

107. The non-transitory computer-readable medium of any of clauses 97-106, wherein the configuration further indicates a third zone associated with a sleep mode for the wireless communication device.

108. The non-transitory computer-readable medium of clause 107, wherein the configuration indicates that one or more of the first zone, the second zone, or the third zone occurs during an active time of a connected mode discontinuous reception (CDRX) cycle of the wireless communication device.

109. The non-transitory computer-readable medium of clause 108, wherein at least one of the first zone or the second zone is time aligned with a beginning of the active time of the CDRX cycle.

110. The non-transitory computer-readable medium of any of clauses 108-109, further comprising:
code for causing the wireless communication device to cause an early termination of the active time of the CDRX cycle based on the third zone.

111. The non-transitory computer-readable medium of any of clauses 97-110, wherein the configuration is specific to the wireless communication device for XR data reception.

112. The non-transitory computer-readable medium of any of clauses 97-111, wherein the receiving the configuration includes receiving at least one of a radio resource control (RRC) configuration, downlink control information (DCI), or a media access control control element (MAC-CE).

113. A non-transitory computer-readable medium having program code recorded thereon for wireless communication by a base station, the program code comprising:
  code for causing the base station to transmit, to a wireless communication device in a connected mode, a configuration based on data traffic for the wireless communication device, the configuration indicating:
    a first zone associated with a first set of operating parameters for the wireless communication device; and
    a second zone associated with a second set of operating parameters for the wireless communication device, the second set of operating parameters being different than the first set of operating parameters; and
  code for causing the base station to transmit a downlink communication signal to the wireless communication device based on the configuration.

114. The non-transitory computer-readable medium of clause 113, wherein the data traffic includes extended reality (XR) data and wherein the first downlink communication signal is an XR downlink communication signal.

115. The non-transitory computer-readable medium of any of clauses 113-114, wherein the configuration is further based on the wireless communication device being configured for discontinuous reception (DRX).

116. The non-transitory computer-readable medium of any of clauses 113-114, wherein the configuration is further based on the wireless communication device not being configured for discontinuous reception (DRX).

117. The non-transitory computer-readable medium of any of clauses 113-116, wherein each of the first zone and the second zone are defined based on at least one of a time domain, a frequency domain, or a combination of time and frequency domains.

118. The non-transitory computer-readable medium of any of clauses 113-117, wherein the first set of operating parameters includes a first slot offset and the second set of operating parameters includes a second slot offset, the second slot offset being less than the first slot offset.

119. The non-transitory computer-readable medium of any of clauses 113-118, wherein the first set of operating parameters includes a first bandwidth and the second set of operating parameters includes a second bandwidth, the second bandwidth being greater than the first bandwidth.

120. The non-transitory computer-readable medium of any of clauses 113-119, wherein the first set of operating parameters includes a first inactivity timer value and the second set of operating parameters includes a second inactivity timer value, the second inactivity timer value being larger than the first inactivity timer value.

121. The non-transitory computer-readable medium of any of clauses 113-120, wherein the code for causing the base station to transmit the downlink communication signal to the wireless communication device based on the configuration includes:
code for causing the base station to transmit, in the first zone, a downlink control signal in a first slot; and
code for causing the base station to transmit, in the first zone, a downlink data signal in a second slot, the second slot being different than the first slot.

122. The non-transitory computer-readable medium of any of clauses 113-121, wherein the code for causing the base station to transmit the downlink communication signal to the wireless communication device based on the configuration includes:
code for causing the base station to transmit, in the second zone, a further downlink data signal.

123. The non-transitory computer-readable medium of any of clauses 113-122, wherein:
the configuration further indicates a third zone associated with a sleep mode for the XR wireless communication device; and
the code for causing the base station to transmit the downlink communication signal to the wireless communication device based on the configuration includes code for causing the base station to refrain from transmitting the downlink communication signal during the third zone.

124. The non-transitory computer-readable medium of clause 123, wherein the configuration indicates that one or more of the first zone, the second zone, or the third zone occurs during an active time of a connected mode discontinuous reception (CDRX) cycle of the wireless communication device.

125. The non-transitory computer-readable medium of clause 124, wherein at least one of the first zone or the second zone is time aligned with a beginning of the active time of the CDRX cycle.

126. The non-transitory computer-readable medium of any of clauses 124-125, wherein the third zone is configured to cause an early termination of the active time of the CDRX cycle.

127. The non-transitory computer-readable medium of any of clauses 113-126, wherein the configuration is specific to the wireless communication device for XR data reception.

128. The non-transitory computer-readable medium of any of clauses 113-127, wherein the code for causing the base station to transmit the configuration includes code for causing the base station to transmit at least one of a radio resource control (RRC) configuration, downlink control information (DCI), or a media access control control element (MAC-CE).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:

1. A method of wireless communication performed by a network device, the method comprising:
transmitting, to a wireless communication device in a connected mode, a configuration based on data traffic for the wireless communication device and further based on the wireless communication device not being configured for discontinuous reception (DRX), the configuration indicating:
a first zone associated with a first set of operating parameters for the wireless communication device; and
a second zone associated with a second set of operating parameters for the wireless communication device, the second set of operating parameters being different from the first set of operating parameters; and
transmitting a downlink communication signal to the wireless communication device based on the configuration.

2. The method of claim 1, wherein:
the data traffic includes extended reality (XR) data; and
the downlink communication signal is an XR downlink communication signal.

3. The method of claim 1, wherein each of the first zone and the second zone are defined based on at least one of a time domain, a frequency domain, or a combination of time and frequency domains.

4. The method of claim 1, wherein:
the first set of operating parameters includes a first slot offset; and
the second set of operating parameters includes a second slot offset, the second slot offset being less than the first slot offset.

5. The method of claim 1, wherein:
the first set of operating parameters includes a first bandwidth; and
the second set of operating parameters includes a second bandwidth, the second bandwidth being greater than the first bandwidth.

6. The method of claim 1, wherein:
the first set of operating parameters includes a first inactivity timer value; and
the second set of operating parameters includes a second inactivity timer value, the second inactivity timer value being larger than the first inactivity timer value.

7. The method of claim 1, wherein the transmitting the downlink communication signal to the wireless communication device based on the configuration includes:
transmitting, in the first zone, a downlink control signal in a first slot; and
transmitting, in the first zone, a first downlink data signal in a second slot, the second slot being different from the first slot.

8. The method of claim 7, wherein the transmitting the downlink communication signal to the wireless communication device based on the configuration includes:
transmitting, in the second zone, a second downlink data signal.

9. The method of claim 1, wherein:
the configuration further indicates a third zone associated with a sleep mode for the wireless communication device; and
the transmitting the downlink communication signal to the wireless communication device based on the configuration includes refraining from transmitting the downlink communication signal during the third zone.

10. The method of claim 9, wherein the configuration indicates that one or more of the first zone, the second zone, or the third zone occurs during an active time of a connected mode discontinuous reception (CDRX) cycle of the wireless communication device.

11. The method of claim 10, wherein:
at least one of the first zone or the second zone is time aligned with a beginning of the active time of the CDRX cycle;
the third zone is configured to cause an early termination of the active time of the CDRX cycle; and
the configuration is specific to the wireless communication device for XR data reception.

12. The method of claim 1, wherein the transmitting the configuration includes transmitting the configuration via at least one of a radio resource control (RRC) configuration, downlink control information (DCI), or a media access control control element (MAC-CE).

13. A network device, comprising:
one or more memories; and
one or more processors coupled to the one or more memories, the one or more memories storing instructions that are executable by the one or more processors, configured individually or in any combination, to cause the network device to:
transmit, to a wireless communication device in a connected mode, a configuration based on data traffic for the wireless communication device and further based on the wireless communication device not being configured for discontinuous reception (DRX), the configuration indicating:
a first zone associated with a first set of operating parameters for the wireless communication device; and
a second zone associated with a second set of operating parameters for the wireless communication device, the second set of operating parameters being different from the first set of operating parameters; and
transmit a downlink communication signal to the wireless communication device based on the configuration.

14. The network device of claim 13, wherein:
the data traffic includes extended reality (XR) data; and
the downlink communication signal is an XR downlink communication signal.

15. The network device of claim 13, wherein each of the first zone and the second zone are defined based on at least one of a time domain, a frequency domain, or a combination of time and frequency domains.

16. The network device of claim 13, wherein:
the first set of operating parameters includes a first slot offset; and
the second set of operating parameters includes a second slot offset, the second slot offset being less than the first slot offset.

17. The network device of claim 13, wherein:
the first set of operating parameters includes a first bandwidth; and the second set of operating parameters includes a second bandwidth, the second bandwidth being greater than the first bandwidth.

18. The network device of claim 13, wherein:
the first set of operating parameters includes a first inactivity timer value; and
the second set of operating parameters includes a second inactivity timer value, the second inactivity timer value being larger than the first inactivity timer value.

19. The network device of claim 13, wherein the transmitting the downlink communication signal to the wireless communication device based on the configuration includes:
transmitting, in the first zone, a downlink control signal in a first slot; and
transmitting, in the first zone, a first downlink data signal in a second slot, the second slot being different from the first slot.

20. The network device of claim 19, wherein the transmitting the downlink communication signal to the wireless communication device based on the configuration includes:
transmitting, in the second zone, a second downlink data signal.

21. The network device of claim 13, wherein:
the configuration further indicates a third zone associated with a sleep mode for the wireless communication device; and
the transmitting the downlink communication signal to the wireless communication device based on the configuration includes refraining from transmitting the downlink communication signal during the third zone.

22. The network device of claim 21, wherein the configuration indicates that one or more of the first zone, the second zone, or the third zone occurs during an active time of a connected mode discontinuous reception (CDRX) cycle of the wireless communication device.

23. The network device of claim 22, wherein:
at least one of the first zone or the second zone is time aligned with a beginning of the active time of the CDRX cycle;
the third zone is configured to cause an early termination of the active time of the CDRX cycle; and
the configuration is specific to the wireless communication device for XR data reception.

24. The network device of claim 13, wherein the one or more processors are further configured, individually or in any combination, to cause the network device to transmit the configuration via at least one of a radio resource control (RRC) configuration, downlink control information (DCI), or a media access control control element (MAC-CE).

25. A network device, comprising:
means for transmitting, to a wireless communication device in a connected mode, a configuration based on data traffic for the wireless communication device and further based on the wireless communication device not being configured for discontinuous reception (DRX), the configuration indicating:
a first zone associated with a first set of operating parameters for the wireless communication device; and
a second zone associated with a second set of operating parameters for the wireless communication device, the second set of operating parameters being different from the first set of operating parameters; and
means for transmitting a downlink communication signal to the wireless communication device based on the configuration.

26. A non-transitory computer-readable medium having program code recorded thereon for wireless communication by a network device, the program code comprising:
code for causing the network device to transmit, to a wireless communication device in a connected mode, a configuration based on data traffic for the wireless communication device and further based on the wireless communication device not being configured for discontinuous reception (DRX), the configuration indicating:
a first zone associated with a first set of operating parameters for the wireless communication device; and
a second zone associated with a second set of operating parameters for the wireless communication device, the second set of operating parameters being different from the first set of operating parameters; and
code for causing the network device to transmit a downlink communication signal to the wireless communication device based on the configuration.

* * * * *